US007151797B2

(12) United States Patent
Limberg

(10) Patent No.: US 7,151,797 B2
(45) Date of Patent: Dec. 19, 2006

(54) ADAPTIVE K-FACTOR-IMPROVEMENT FILTER FOR RECEIVER OF RADIO SIGNALS SUBJECT TO MULTIPATH DISTORTION

(76) Inventor: Allen LeRoy Limberg, 2500 Lakevale Dr., Vienna, VA (US) 22181-4028

( * ) Notice: Subject to any disclaimer, the term of this patent is extended or adjusted under 35 U.S.C. 154(b) by 800 days.

(21) Appl. No.: 10/383,085

(22) Filed: Mar. 6, 2003

(65) Prior Publication Data

US 2003/0215029 A1 Nov. 20, 2003

Related U.S. Application Data

(60) Provisional application No. 60/380,438, filed on May 14, 2002.

(51) Int. Cl.
*H03H 7/30* (2006.01)
(52) U.S. Cl. ...................................................... 375/232
(58) Field of Classification Search ................ 375/232, 375/233, 350
See application file for complete search history.

(56) References Cited

U.S. PATENT DOCUMENTS 6,775,322 B1 * 8/2004 Zangi et al. ................ 375/232
6,868,120 B1 * 3/2005 Gormley et al. ............ 375/224

* cited by examiner

*Primary Examiner*—Kevin Kim

(57) ABSTRACT

An adjustable K-factor-improvement (KFI) filter having a sparse kernel composed of non-zero weighting coefficients of substantially equal amplitudes is included in a receiver for digital television signals or the like. The receiver includes apparatus for measuring the channel impulse response (CIR) or cepstrum of the signal as received. The respective polarities of the non-zero weighting coefficients in the sparse kernel of the adjustable KFI filter are adjusted responsive to the measured CIR. The differential delay between each successive pair of non-zero weighting coefficients in the sparse kernel of the adjustable K-factor-improvement filter is adjusted responsive to the measured CIR. The adjustment is such that the KFI filter response has a principal component with substantially more energy than any of its echo components. The KFI filter response is applied as input signal to subsequent adaptive equalization filtering in the receiver.

5 Claims, 13 Drawing Sheets

TIME →

TIME

TIME →

TIME →

TIME →

TIME →

TIME →

TIME →

ADAPTIVE K-FACTOR-IMPROVEMENT FILTER FOR RECEIVER OF RADIO SIGNALS SUBJECT TO MULTIPATH DISTORTION

This application is filed under 35 U.S.C. 111(a) claiming per 35 U.S.C 119(e)(1) benefit of the filing date of provisional U.S. patent application serial No. 60/380,438 filed on May 14, 2002 under 35 U.S.C. 111(b).

The invention relates to adaptive equalization filtering in receivers for radio signals subject to changing multipath distortion and, more particularly, to receivers for vestigial-sideband amplitude-modulation (VSB AM) radio signals such as those employed for digital television (DTV) broadcasting.

BACKGROUND OF THE INVENTION

DTV broadcasting in the United States of America has been done in accordance with the ATSC Digital Television Standard published by the Advanced Television Systems Committee (ATSC) in September 1995 as Document A/53 and referred to simply as "A/53". The construction of receivers for receiving DTV broadcast transmissions is described in Guide to the se of the ATSC Digital Television Standard published by ATSC in October 1995 as Document A/54 and referred to simply as "A/54".

Customarily, the adaptive equalization filtering for a DTV receiver is digital filtering performed at baseband after the VSB AM signals are demodulated. The adaptive equalization filtering is done for suppressing multipath responses in the received signal, which multipath responses arrive via various-length transmission paths with varying amounts of attenuation. The digital filtering weights the baseband demodulation result as variously delayed and then combines the weighting results, so as to select a stronger principal one of the multipath responses that arrives via a transmission path relatively free of attenuation. The resulting equalizer response better corresponds to the modulating signal sent by the transmitter than does the baseband demodulation result supplied to the adaptive equalization filtering as its input signal. The weighting of each of the variously delayed responses that are combined to generate the equalizer response is carried forward by digital multiplication. Read-only memory can be used to implement the digital multiplications in order to achieve faster multiplication speed.

Multipath responses (or "echoes") that precede the principal or "cursor" response in the received signal are referred to as "pre-echoes", and multipath responses that succeed the principal response in the received signal are referred to as "post-echoes". The use of finite-impulse-response (FIR) adaptive equalization filtering to suppress echoes generates "repeat echoes" with greater differential delay respective to the principal response. Each repeat echo arises because the original echo or a repeat echo with lesser delay is suppressed using the full spectrum of the filter input signal as differentially delayed respective to the principal response, rather than using just differentially-delayed principal response. Each repeat echo of significant energy requires a further respective digital multiplication for its suppression and gives rise to a still further repeat echo. Each repeat echo is of opposite sense of polarity from the echo that was suppressed to result in that repeat echo being generated. As long as an echo is weak, having substantially less energy than the principal component of the received signal, the repeat echo will be even more attenuated respective to the principal component of the received signal. After few cycles of repeated suppression of a weak echo and its repeat echoes, the remnant repeat echo has insignificant energy compared to the principal component of the received signal. Whether or not the energy of a remnant repeat echo has significant energy compared to the principal component of the received signal is judged on the basis of how much the results of data slicing of the response of the complete equalization filtering is affected by the remnant repeat echo.

The problem in FIR adaptive equalization filtering is that when an echo is very strong, having substantially as much energy as the principal component of the received signal, the repeat echo is not substantially attenuated respective to the principal component of the received signal. Even after many cycles of repeated suppression of a strong echo and its repeat echoes, the remnant repeat echo is likely to have significant energy compared to the principal component of the received signal. If the echo is stronger in energy than the principal component of the received signal, the repeat echoes will not be attenuated respective to the principal component of the received signal, but will successively grow respective to the principal component of the received signal.

Infinite-impulse-response (IIR) adaptive equalization filtering is preferred for suppressing post-echoes, particularly those that are substantially delayed. Such recursive filtering reduces the generation of "repeat echoes" because the original post-echo is suppressed using the response of the IIR adaptive equalization filtering, rather than using the full spectrum of the filter input signal. It is customary to cascade the IIR filtering used for suppressing substantially delayed post-echoes after FIR filtering used for suppressing pre-echoes and short-delay post-echoes, to facilitate decision-feedback equalization (DFE) being used instead of linear-feedback equalization (LFE). The preceding FIR filtering suppresses pre-echoes in the response of the subsequent IIR adaptive equalization filtering, which further reduces the generation of "repeat echoes" in the IIR filtering. Very strong echoes still present a problem because the loop gain in the IIR filtering for suppressing them becomes high enough that there is a self-oscillatory tendency in the loop.

A paper titled "A VSB DTV Receiver Designed for Indoor and Distributed Transmission Environments" was presented at the IEEE 52$^{nd}$ Annual Broadcast Symposium held in Washington, D.C. the ninth through eleventh of October 2002. The paper authored by R. Citta, X. Wang, Y. Wu, B. Ledoux, S. Lafleche and B. Caron described an approach to better accommodation of strong echoes that is embodied in a receiver commonly referred to as the LINX receiver, since it was designed by LINX Electronics, Inc. The LINX receiver measures the reception channel impulse response (CIR) or cepstrum. Prior to equalization the received signal is passed through a CIR-mirror filter. The CIR-mirror filter is an FIR digital filter with weighting coefficients that have values proportional to components of the CIR, but arranged with reversal in time of occurrence. The CIR-mirror filter response provides an equalizer input signal with a modified CIR that has an echo range twice that of the original CIR. All pre-echoes in the original CIR appear in the modified CIR together with post-echoes mirroring them, and all post-echoes in the original CIR appear in the modified CIR together with pre-echoes mirroring them. The modified CIR from the CIR-mirror filter is symmetrical, with the principal component of the modified CIR being centrally located. The principal component of the modified CIR from the CIR-mirror filter constructively combines the power of all the components of the original CIR. The CIR-mirror filter response generally has many more pre-echoes than the original CIR. Post-echoes delayed by many microseconds are more often encountered than pre-echoes advanced by many microseconds, unless single-frequency networks of multiple-transmitters are used in a reception area. So, the echo range of the pre-echo spectrum is usually extended in the CIR-mirror filter response. However, even though there are more pre-echoes in the modified CIR that the CIR-mirror filter provides as its response, the principal component of that response has substantially larger energy than any other component. Accordingly, repeat pre-echoes are attenuated in fewer cycles of repetition than is the case with the original CIR that has pre-echo components with substantially as much energy as its principal component.

The modified CIR having a principal component with substantially larger energy than any other component is the critical factor for successful equalization filtering, rather than that principal component combines the power of all the components of the original CIR. Combining the power of all the components of the original CIR was the rationale for using a CIR-mirror filter in the LINX receiver design. This alternative formulation of the inventive problem permits designs in which a modified CIR has an echo range substantially smaller than twice that of the original CIR. The modified CIR in these designs contains fewer echoes than the response of a CIR-mirror filter, and the sparser echo structure facilitates adaptation of the equalization filtering. These designs do not generate a pre-echo in the modified CIR for every post-echo in the original CIR, so many post-echoes can be suppressed entirely by IIR filtering.

A Ricean K-factor can be defined as the ratio of the power in the dominant path to the total power of all the echo paths, as follows:

$$K = \frac{\rho_0^2}{\sum_{i=1}^{N} \rho_i^2}.$$

In this specification a digital filter that responds to a received signal having a low K-factor with an output signal having a substantially-higher K factor is referred to as a K-factor-improvement filter or as a KFI filter, for short. The mirror filter used in the LINX receiver is a species of KFI filter. The KFI filters used in the invention are of another species, having a sparse kernel composed of a pair of non-zero weighting coefficients of equal, or substantially equal, amplitudes.

SUMMARY OF THE INVENTION

The invention is embodied in a receiver for digital television signals or the like, which receiver includes an adjustable K-factor-improvement (KFI) filter having a sparse kernel composed of a pair of non-zero weighting coefficients of substantially equal amplitudes. The DTV receiver includes apparatus for measuring the channel impulse response (CIR) or cepstrum of the signal as received. The respective polarities of the pair of non-zero weighting coefficients in the sparse kernel of the adjustable KFI filter are adjusted responsive-to the measured CIR. The differential delay between the pair of non-zero weighting coefficients in the sparse kernel of the adjustable KFI filter is adjusted responsive to the measured CIR. The adjustments are such that the KFI filter response has a principal component with, substantially more energy than any of its echo components, which KFI filter response is applied as input signal to subsequent adaptive equalization filtering.

DETAILED DESCRIPTION

Figure 1:
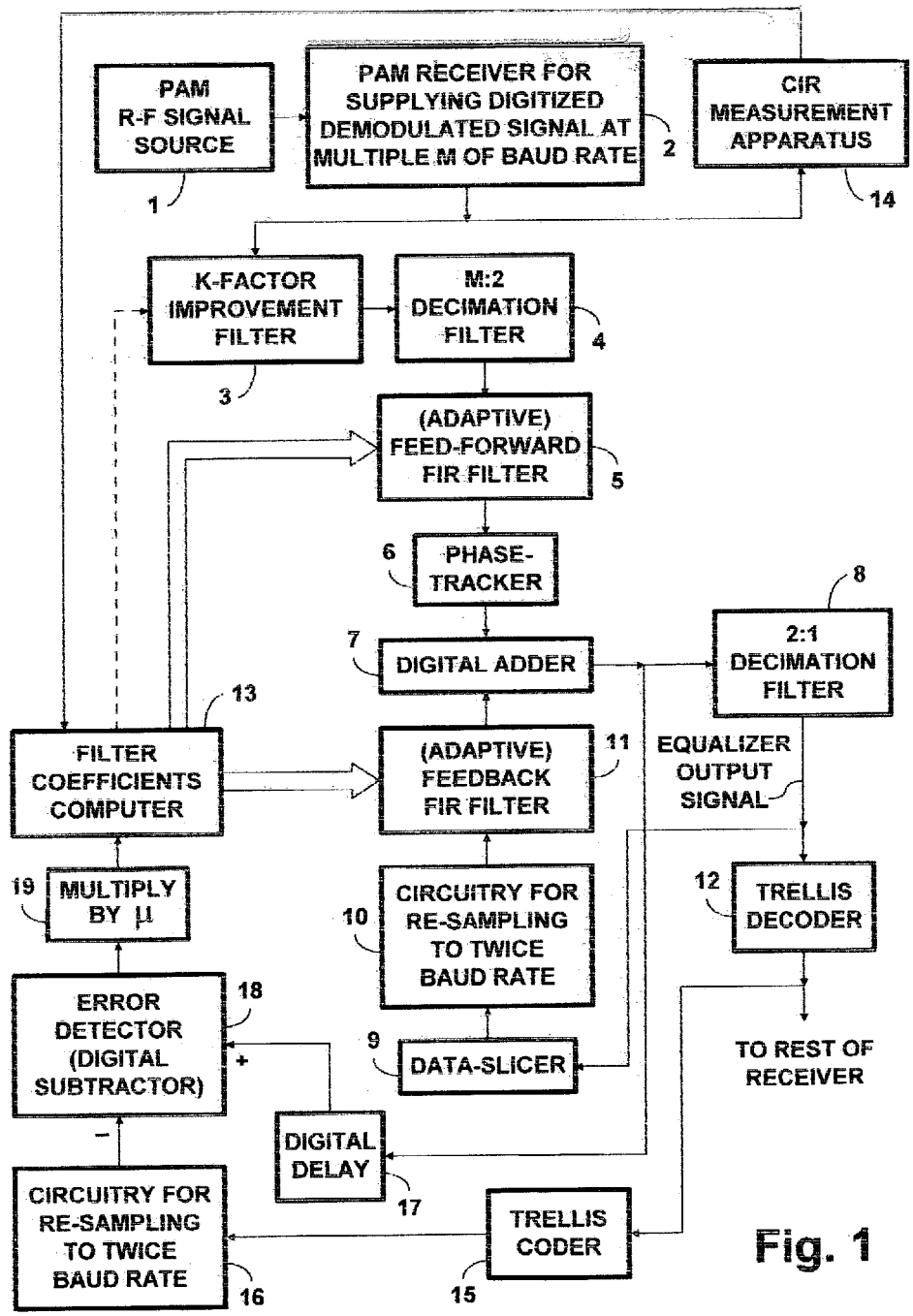
FIG. 1 is a schematic diagram of a receiver for radio-frequency signals with digital modulation, which receiver in accordance with a principal aspect of the invention includes a K-factor-improvement (KFI) filter for modifying the channel impulse response of received signals before equalization.

FIG. 1 shows a receiver for radio-frequency signals with digital modulation, which receiver is suitable for incorporation into a digital television (DTV) receiver. A source 1 of pulse-amplitude-modulated (PAM) radio-frequency signals, such as an antenna or a cable connection, is connected for supplying those signals to a PAM receiver 2 which responds to supply digital samples of a demodulated signal at a multiple, M, of baud rate. M is an integer, typically four or more, which high sampling rate supports polyphase digital filtering that the PAM receiver 2 employs for shaping the Nyquist roll-off of the reception channel.

A K-factor-improvement filter 3 for modifying the channel impulse response (CIR) in accordance with the invention is connected for receiving as its input signal the M-times-baud-rate digital samples of the demodulated signal that the PAM receiver 2 supplies. An M:2 decimation filter 4 is connected for receiving as its input signal the M-times-baud-rate digital samples of the K-factor-improvement filter 3 response and for supplying twice-baud-rate digital samples of the KFI filter 3 response to subsequent adaptive digital filtering operated to provide fractional channel-equalization including echo suppressions. FIG. 1 shows this subsequent adaptive digital filtering following the M:2 decimation filter 4 as comprising the cascade connection of a feed-forward finite-impulse-response (FIR) filter 5 with adjustable weighting coefficients, a phase-tracker 6 and an infinite-impulse-response (IIR) filter composed of elements 7–11. The response of the feed-forward FIR filter 5 is supplied as the phase-tracker 6 input signal, and the phase-tracker 6 output signal is supplied as the IIR filter input signal. This IIR filter input signal is applied as first summand input signal to a digital adder 7 in the IIR filter. A second summand input signal to the adder 7 is the response of a feedback FIR filter 11 with adjustable weighting coefficients. The adder 7 linearly combines the phase-tracker 6 output signal with the response of the feedback FIR filter 11 to generate a sum output signal supplied from the adder 7 as an over-sampled equalizer response. This over-sampled equalizer response is decimated by a 2:1 decimation filter 8 to provide baud-rate equalizer response, suitable for application to a data-slicer 9 as input signal thereto. Circuitry 10 re-samples the baud-rate data-slicer 9 response to twice baud rate to generate an over-sampled data-slicer response. This over-sampled data-slicer response is applied as input signal to the feedback FIR filter 11, thereby completing the feedback loops in the IIR filter composed of elements 7–11.

The 2:1 decimation filter 8 response is the IIR filter output signal, supplying baud-rate equalized baseband as input signal to a trellis decoder 12 which operates as a symbol decoder for supplying data to the rest of the receiver. FIG. 1 does not show the rest of the receiver, which can be of conventional construction. If it is a DTV receiver for DTV signals as prescribed by A/53, the typical construction of the rest of the receiver is as follows. A de-interleaver is connected for undoing the convolutional interleaving of the data output signal of the trellis decoder 12. Reed-Solomon error-correction circuitry is connected for correcting byte errors in the de-interleaved data output signal of the trellis decoder 12. The trellis decoder 12 can be constructed to furnish information concerning the most likely locations of byte errors to the R-S error-correction circuitry so that circuitry can correct as many as twenty erroneous bytes per data packet. A de-randomizer is connected for responding to the error-corrected data output signal of the R-S error-correction circuit to recover a transport stream of data packets. A transport stream de-multiplexer is connected for sorting video packets to MPEG-2 video de-compression circuitry and sorting audio packets to AC-3 audio de-compression circuitry.

FIG. 1 does not explicitly show the details of the construction of the FIR filters 5 and 11. The first FIR filter 5 includes a number of digital multipliers for multiplying differentially delayed responses to the adaptive equalizer input signal received as respective multiplicand input signals by respective weighting coefficients to respective generate product output signals that are summed to generate the FIR filter 5 response. The weighting coefficients that the digital multipliers in the FIR filter 5 use as multiplier input signals are stored in a weighting coefficients register for the FIR filter 3, which register is periodically updated. The second FIR filter 11 includes a number of digital multipliers for multiplying differentially delayed responses to the adaptive equalizer output signal received as respective multiplicand input signals by respective weighting coefficients to respective generate product output signals that are additively combined to generate the FIR filter 11 response. The weighting coefficients that the digital multipliers in the FIR filter 9 use as multiplier input signals are stored in a weighting coefficients register for the FIR filter 11, which register is periodically updated. Each of the digital multipliers in the FIR filters 5 and 11 can be constructed as a read-only memory (ROM) to avoid the appreciable latent delay associated with a digital multiplier constructed as an arithmetic/logic unit (ALU).

A small dedicated computer 13 computes weighting coefficients that are supplied to the weighting coefficient registers for the FIR filters 5 and 11. Normally, this filter coefficients computer 13 and the component computers thereof are constructed within integrated circuitry as a "microprocessor" type of computer. Whenever the DTV receiver is powered up after not receiving power for some time, whenever the reception channel is changed, or whenever the error-correction circuitry indicates a current set of weighting coefficients to be seriously in error, the computer 13 computes a set of initial weighting coefficients. This set of initial weighting coefficients is then supplied to the weighting coefficient registers for the FIR filters 3 and 9, as well as providing a basis for the computer 13 further adjusting the weighting coefficients by a data-directed method.

The computation of initial weighting coefficients by the computer 13 proceeds from CIR measurement information extracted by CIR measurement apparatus 14 connected for receiving as its input signal the M-times-baud-rate digital samples of the demodulated signal that the PAM receiver 2 supplies. The CIR measurement supplied from a parallel-output register of the CIR measurement apparatus 14 describes the respective echo energy at successive points in time, which successive points in time map to locations in that parallel-output register.

One known way of measuring CIR uses a block of multiple-baud-rate samples extending over a few thousand symbol epochs, which received samples are presumed to be essentially random in nature. The lengthiness of the block of samples improves the validity of this presumption. The block of samples is zero extended to an integral power of two number of samples. The discrete Fourier transform (DFT) of the zero-extended block of samples is divided term-by-term by the DFT of the ideal channel response with raised-cosine roll-offs, in order to determine the DFT of the CIR. The terms of the DFT of the ideal channel response that are smaller than a prescribed value are replaced by that prescribed value to avoid dividing by terms that are too close to zero value. Then, an inverse discrete Fourier transform (IDFT) procedure is performed on the DFT of the CIR to generate the CIR in the time domain. The lengthiness of the block of samples reduces the effects of post-echoes from samples preceding the block and pre-echoes of samples succeeding the block on the CIR measurement. The term-by-term division process in the DFT domain corresponds to de-convolution in the time domain.

A known alternative way of measuring CIR zero utilizes the PN511 sequence received in the initial segment of a data field, which is zero-extended to an integral power of two number of samples. The DFT of the CIR is determined by dividing the DFT of the zero-extended block of samples, term-by-term, by the DFT of the ideal channel response to a PN511 sequence. The terms of the DFT of the ideal channel response to a PN511 sequence that are smaller than a prescribed value are replaced by that prescribed value to avoid dividing by terms that are too close to zero value. An IDFT procedure is performed on the DFT of the CIR to generate the CIR in the time domain.

FIG. 1 shows the following apparatus for generating information concerning reception error arising from non-optimal equalization. This information is utilized by the computer 13 in the data-directed method used for further adjusting the weighting coefficients of the FIR filters 5 and 11. A trellis coder 15 codes the data recovered by the trellis decoder 12 to generate symbols that are used as estimates of the symbols that the transmitter broadcast to receivers. The trellis coder 15 generates symbols at baud rate, and circuitry 16 re-samples the trellis coder 15 output signal to twice baud rate. The samples of equalizer response supplied at twice baud rate as sum output signal from the digital adder 7 are delayed by digital delay circuitry 17. Delay circuitry 17 compensates for the latent delay of the cascade-connection of the 2:1 decimation filter 8, the trellis decoder 12, the trellis coder 15 and the circuitry 16 for re-sampling the trellis coder 15 output signal to twice baud rate. An error detector 18 is connected for generating reception error measurements by comparing the delayed twice-baud-rate equalizer response supplied by the delay circuitry 17 with the twice-baud-rate estimate of the symbol stream broadcast by the transmitter. This estimate is supplied by the circuitry 16 for re-sampling the trellis coder 15 output signal. The error detector 18 as shown in FIG. 1 is essentially a digital subtractor. This subtractor is connected to receive, as its minuend input signal, the delayed twice-baud-rate equalizer response supplied by the delay circuitry 17. This subtractor is connected to receive, as its subtrahend input signal, the twice-baud-rate estimate of the broadcast symbol stream supplied by the circuitry 16 for re-sampling the trellis coder 15 output signal. The subtractor is connected to supply its difference output signal as multiplicand input signal to a digital multiplier 19, for multiplication by a factor $\mu$. The digital multiplier 19 is connected to supply its product output signal as a further input signal to the filter coefficients computer 13, which uses the error measurements in the data-directed method of computing adjustments to the weighting coefficients of the FIR filters 5 and 11. These adjustments can be made using the well-known LMS (least-mean-squares) algorithm, for example, with the multiplication by the factor $\mu$ in the digital multiplier 19 determining the step size used in executing the algorithm.

Although not explicitly shown in FIG. 1, the factor $\mu$ that the digital multiplier 19 uses as multiplier signal can be adjusted responsive to the confidence factors of the final decisions that the trellis decoder 12 makes concerning the received symbols. If there is high confidence that such a final decision is correct the factor $\mu$ can be chosen to he higher. If there is low confidence that such a final decision is correct, the factor $\mu$ can be chosen to be lower. A succession of final decisions in which there is very little confidence probably is indicative of the reception of disruptive burst noise, and the factor can accordingly be set to zero.

While the trellis decoder 12 takes longer to make final decisions than the data-slicer 9, the decisions are less apt to be in error. The adaptation of the weighting coefficients of the FIR filters 5 and 11 normally takes hundreds of symbol-epochs time in any case. The few tens of symbol epochs time taken for the trellis decoder 12 to supply final decisions that are less apt to be in error is rewarded by being able to use a larger factor $\mu$ determining the step size in the adaptation algorithm following error gradient. The larger step size reduces the overall time required for converging the weighting coefficients of the FIR filters 5 and 11 to correct values.

The interposition of delay between the output port of the FIR filter 5 and the summand input port of the digital adder 7 affects the phasing of symbols in each of these filters relative to the phasing of symbols in the other. However, the interposed delay affects neither the computation of the weighting coefficients of the FIR filter 5 nor the computation of the weighting coefficients of the FIR filter 11. This is the case, presuming the FIR filters 5 and 11 have structures that are independent of each other. These observations are the basis for being able to introduce de-rotation after the FIR filter 5 to implement phase-tracking or symbol synchronization. The de-rotation phases symbols in the sum output signal from the digital adder 7 so as to minimize intersymbol interference in the decision-feedback signal generated by the data-slicer 9. The phase-tracker (or symbol synchronizer) 6 used for de-rotation is preferably one of the types that A. L. R. Limberg describes in U.S. patent application Ser. No. 10/351,866 filed 27 Jan. 2003. The application is titled "PAM Radio Signal Receiver with Phase-Tracker Succeeding Adaptive FIR Filtering and Preceding Adaptive IIR Filtering" and was published 20 Nov. 2003 with publication No. 2003-0215029. One of these types of phase-tracker 6 will be described in detail further on in this specification with reference to FIG. 12 of the drawing.

Figure 2A:
FIGS. 2A, 2B, 2C, 2D, 2E, 2F and 2G are diagrams of channel impulse responses in the time domain, which diagrams illustrate how the combining differentially delayed received DTV signals can be beneficial when receiving a first type of DTV signal comprising two strong multipath components.
Figure 2B:
Figure 2C:
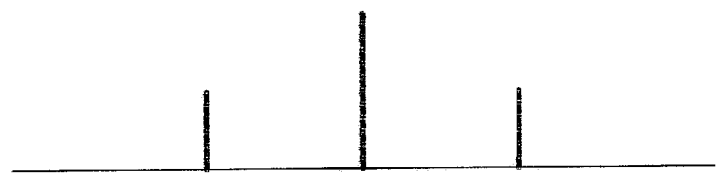

FIGS. 2A, 2B, 2C, 2D, 2E, 2F and 2G illustrate what the K-factor-improvement filter 3 enables the FIG. 1 DTV receiver to do for a reception channel comprising two principal multipath components of equal strength and similar polarity. FIG. 2C is initially considered as being plotted against an earlier time abscissa that FIGS. 2A and 2B are also plotted against. FIG. 2A shows the channel impulse response (CIR) for the reception channel comprising two principal multipath components of equal strength and similar polarity. FIG. 2B shows the CIR for that channel as extended by further delay, so the earlier multipath component of the FIG. 2B CIR temporally aligns with the later multipath component of the FIG. 2A CIR. FIG. 2C shows the CIR for a channel that additively combines the responses of the FIG. 2A channel and the FIG. 2B channel. Note that the principal component of the FIG. 2C CIR has twice the energy of a pre-echo corresponding to the earlier multipath component of the FIG. 2A CIR and also has twice the energy of a post-echo corresponding to the later multipath component of the FIG. 2B CIR. To the extent that contemporaneous AWGN is uncorrelated in FIGS. 2A and 2B, the signal-to-noise ratio (SNR) of the principal component of the FIG. 2C CIR is improved as much as 6.02 dB against AWGN from sources other than unsuppressed echo energy.

Figure 2D:

With regard to the operation of the adaptive equalization filter comprising component elements 5–11, FIG. 2C is considered as showing a delayed CIR of the KFI filter 3, plotted against a later time abscissa that FIGS. 2D, 2E, 2F and 2G are also plotted against. FIG. 2D shows a less-delayed CIR of the KFI filter 3, as multiplied by a negative weighting coefficient, which FIG. 2D CIR is combined with the FIG. 2C CIR to result in the FIG. 2E CIR in which the pre-echo from the FIG. 2C CIR is suppressed. To the extent that contemporaneous A WGN is uncorrelated in FIGS. 2C and 2D, the principal component of the FIG. 2E CIR gains as much as 1.74 dB or so against AWGN from sources other than unsuppressed echo energy. Much of this gain can retained, providing that the post-echo is delayed sufficiently that it can be suppressed by IIR filtering that uses decision feedback.

Figure 2E:
Figure 2F:
Figure 2G:

FIG. 2F shows a more-delayed CIR of the KFI filter 3, as multiplied by a negative weighting coefficient, which FIG. 2F CIR is combined with the FIG. 2E CIR to result in the FIG. 2G CIR in which the post-echo from the FIG. 2C CIR is suppressed. This is an FIR filtering procedure that is used for suppressing post-echoes that are less delayed. The principal component of the FIG. 2E CIR still gains as much as 1.25 dB or so against AWGN from sources other than unsuppressed echo energy. In practice, the post-echo is usually suppressed using IIR filtering, which avoids the generation of the repeat post-echo.

Figure 3A:
FIGS. 3A, 3B, 3C, 3D, 3E, 3F and 3G are diagrams of channel impulse responses in the time domain, which diagrams illustrate how the combining of differentially delayed received DTV signals can be beneficial when receiving a second type of DTV signal comprising two strong multipath components.
Figure 3B:
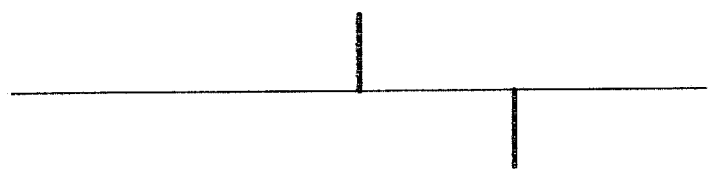
Figure 3C:
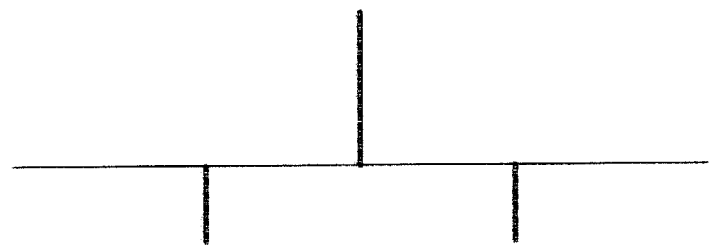

FIGS. 3A, 3B, 3C, 3D, 3E, 3F and 3G illustrate what the K-factor-improvement filter 3 enables the FIG. 1 DTV receiver to do for a reception channels comprising two principal multipath components of equal strength and opposite polarity. FIG. 3C is initially considered as being plotted against an earlier time abscissa that FIGS. 3A and 3B are also plotted against. FIG. 3A shows the channel impulse response (CIR) for the reception channel comprising two principal multipath components of equal strength and opposite polarity. FIG. 3B shows the CIR for that channel as extended by further delay, so the earlier multipath component of the FIG. 3B CIR temporally aligns with the later multipath component of the FIG. 3A CIR. FIG. 3C shows the CIR for a channel that differentially combines the responses of the FIG. 3A channel and the FIG. 3B channel. Note that the principal component of the FIG. 3C CIR has twice the energy of a pre-echo corresponding to the earlier multipath component of the FIG. 3A CIR and also has twice the energy of a post-echo corresponding to the later multipath component of the FIG. 3B CIR. To the extent that contemporaneous AWGN is uncorrelated in FIGS. 3A and 3B, the SNR of the principal component of the FIG. 3C CIR is improved as much as 6.02 dB against AWGN from sources other than unsuppressed echo energy.

Figure 3D:
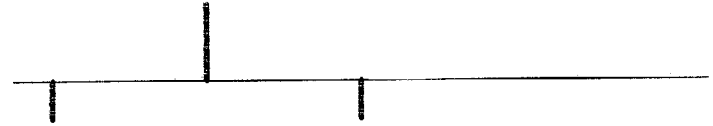

With regard to the operation of the adaptive equalization filter, FIG. 3C is considered as showing a delayed CIR of the KFI filter 3, plotted against a later time abscissa that FIGS. 3D, 3E, 3F and 3G are also plotted against. FIG. 3D shows a less-delayed CIR of the KFI filter 3, as multiplied by a positive weighting coefficient, which FIG. 3D CIR is combined with the FIG. 3C CIR to result in the FIG. 3E CIR in which the pre-echo from the FIG. 3C CIR is suppressed. The principal component of the FIG. 3E CIR gains as much as 1.74 dB or so against AWGN from sources other than unsuppressed echo energy. Much of this gain can retained, providing that the post-echo is delayed sufficiently that it can be suppressed by IIR filtering that uses decision feedback.

Figure 3E:
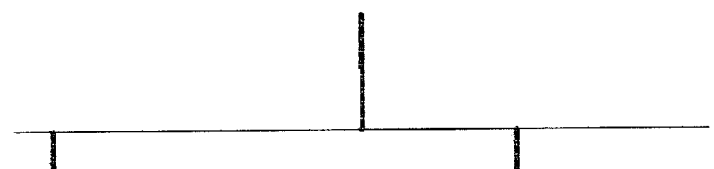
Figure 3F:
Figure 3G:
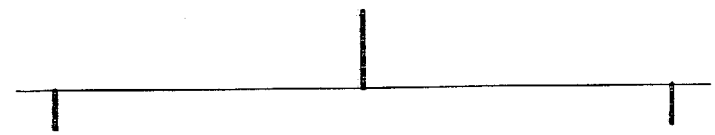

FIG. 3F shows a more delayed CIR of the KFI filter 3, as multiplied by a positive weighting coefficient, which FIG. 3F CIR is combined with the FIG. 3E CIR to result in the FIG. 3G CIR in which the post-echo from the FIG. 3C CIR is suppressed. This is an FIR filtering procedure that must be used for suppressing post-echoes that are less delayed. The principal component of the FIG. 3E CIR still gains as much as 1.25 dB or so against AWGN from sources other than unsuppressed echo energy. In practice, the post-echo is usually suppressed using IIR filtering, which avoids the generation of the repeat post-echo.

The earlier of the pulses in the FIG. 3A CIR is negative, and the later of the pulses in the FIG. 3A CIR is positive. Consequently, the delayed CIR of FIG. 3B is subtracted from the FIG. 3A CIR to generate the FIG. 3C CIR, in which the pulse response to the principal signal is positive in polarity. If the earlier and later of the pulses in the original CIR were respectively positive and negative instead, subtraction of that CIR from the delayed CIR would generate the same FIG. 3C CIR.

Figure 4:
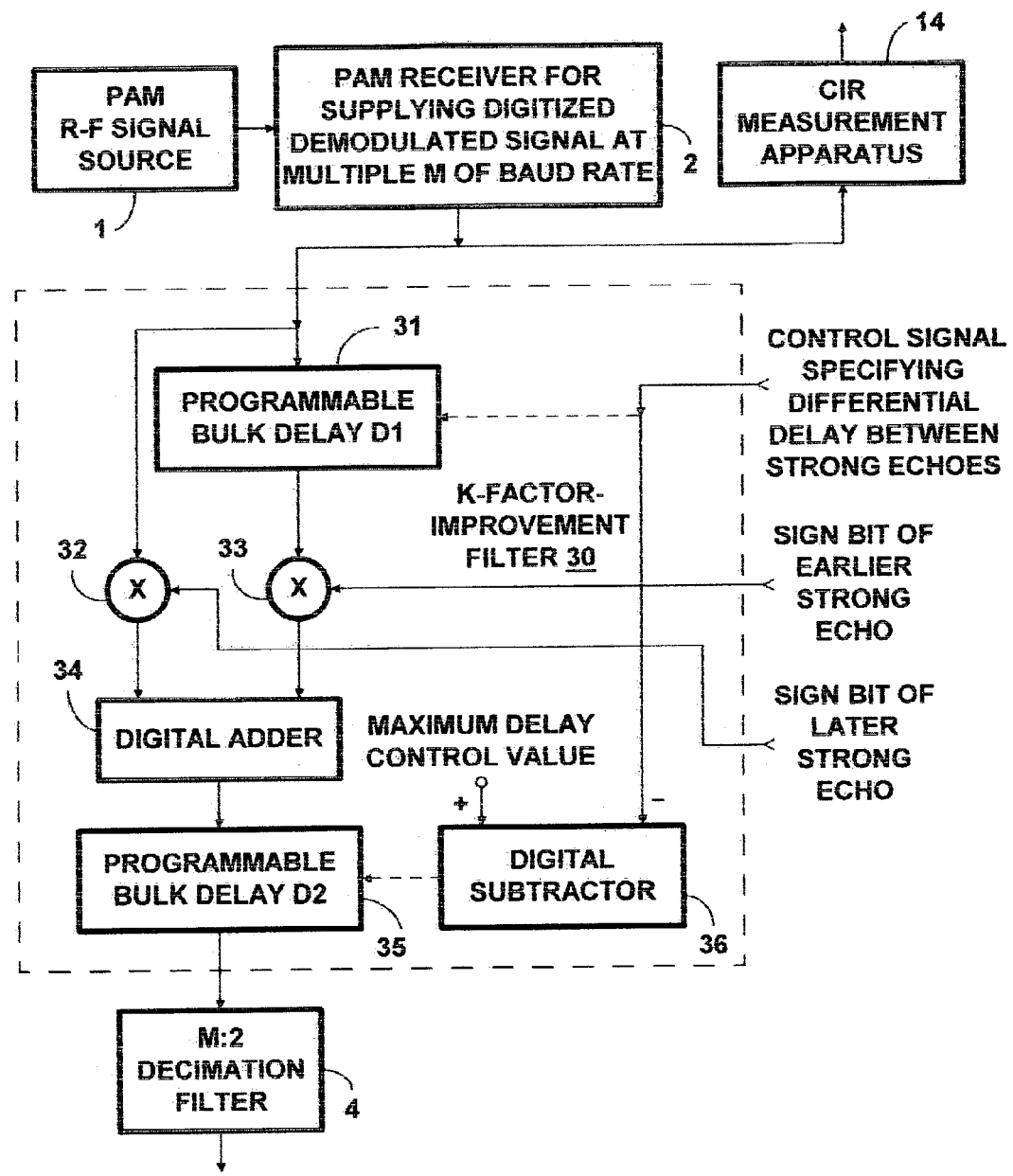
FIG. 4 is a schematic-diagram showing details of the construction of a first species of the K-factor-improvement filter included in the FIG. 1 receiver.

FIG. 4 shows details of the construction of a KFI filter 30 which is a first species of the KFI filter 3 included in the FIG. 1 receiver. The KFI filter 30 includes programmable-bulk-delay circuitry 31 connected for delaying the baseband DTV signal from tile PAM receiver 2. The delayed baseband DTV signal from the programmable-bulk-delay circuitry 31 is combined with the baseband DTV signal supplied from the PAM receiver 2 so as to add the energies of a respective one of the stronger multipath components of each of these baseband DTV signals. A digital multiplier 32 multiplies the baseband DTV signal from the PAM receiver 2 by the polarity of the pulse response to the later of these two multipaths. A digital multiplier 33 multiplies the baseband DTV signal from the demodulator and ADC circuitry 3 by the polarity of the pulse response to the earlier of these two multipaths. The resulting product signals from the multipliers 32 and 33 are additively combined by a digital adder 34. The multiplication operations performed by the digital multipliers 32 and 33 result in the later of the large multipaths in the baseband DTV signal from the demodulator and ADC circuitry 3 additively combining with the earlier of the large multipaths in the baseband DTV signal from the programmable-bulk-delay circuitry 31. The sum output signal from the adder 34 is supplied as input signal to further programmable-bulk-delay circuitry 35. The KFI filter construction 30 is such that the delay D1 of tile programmable-bulk-delay circuitry 31 and the delay D2 of the programmable-bulk-delay circuitry 35 sum to a constant value D of delay.

FIG. 4 shows the difference output signal from a digital subtractor 36 being applied to the programmable-bulk-delay circuitry 35 for controlling its delay. The minuend input signal applied to the subtractor 36 is the control value for maximum delay. The subtrahend input signal applied to the subtractor 36 corresponds to the control signal applied to the programmable-bulk-delay circuitry 31. The adjustable delay D1 of the programmable-bulk-delay circuitry 31 and the adjustable delay D2 of the programmable-bulk-delay circuitry 35 sum to a constant value D of delay, providing that the programmable-bulk-delay circuitry 31 and the programmable-bulk-delay circuitry 35 each provide delay in similar linear response to applied digital control signal.

The output signal from the programmable-bulk-delay circuitry 35 provides the input signal for the adaptive equalization filtering comprising, elements 5–11. More particularly, the output signal from the programmable-bulk-delay circuitry 35 is supplied as input signal to the feed-forward FIR filter 5 in the FIG. 1 DTV receiver.

Figure 5:
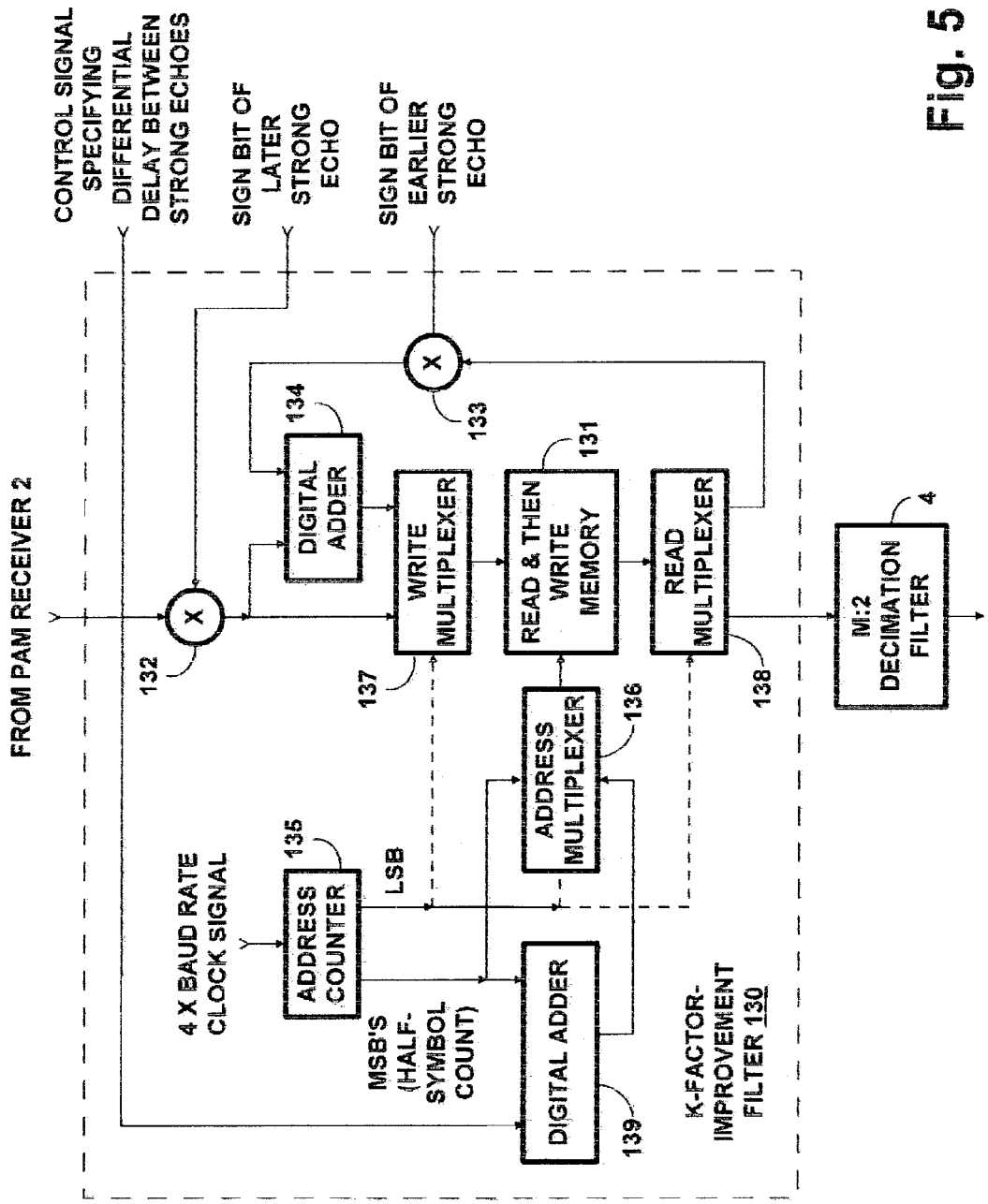
FIG. 5 is a schematic diagram showing details of the construction of a second species of the K-factor-improvement filter included in the FIG. 1 receiver.

FIG. 5 shows details of the construction of a KFI filter 130 that is a second species of the KFI filter 3 included in the FIG. 1 receiver, which KFI filter 130 is used instead of the KFI filter 30 in some embodiments of the invention. In the KFI filter 130, a read-and-then-write memory 131 provides programmable bulk delays corresponding to those provided by the programmable-bulk-delay circuitry 31 and the programmable-bulk-delay circuitry 35 in the KFI filter 30. Digital multipliers 132 and 133 in the KFI filter 130 correspond to the digital multipliers 32 and 33 in-the KFI filter 30. A digital adder 134 in the KFI filter 130 corresponds to the digital adder 34 in the KFI filter 30.

Operation of the read-and-then-write memory 131 is clocked at four times baud rate. An address counter 135 counts at four times baud rate to generate an address count. The least significant bit of this address count controls the operation of an address multiplexer 136, a write multiplexer 137, and a read multiplexer 138. The address counter automatically rolls over from maximum count to zero count, with the time for counting from zero count to maximum count corresponding to the sum of delays D1 and D2 in the KFI filter 30. The least significant bit of the count from the address counter 135 being ZERO conditions the address multiplexer 136 to apply the more significant bits of the count from the address counter 135 to the read-and-then-write memory 131 as the addressing thereof. The least significant bit of the count from the address counter 135 being ZERO conditions the read multiplexer 138 to supply, as the input signal for the remainder of the adaptive equalization filtering, the contents read from the addressed storage location in the memory 131. That is, the read output signal from the memory 131 is supplied as input signal to the 2:1 decimation filter 4 in the FIG. 1 DTV receiver.

The least significant bit of the count from the address counter 135 being ZERO conditions the write multiplexer 137 to apply the product signal from the multiplier 132 to the read-and-then-write memory 131, to be written into the addressed storage location just read from, in place of the previous content. This is done pursuant to the read-and-then-write operation of the memory 131, the apparatus for generating suitably timed-read-enable and write-enable signals for implementing this operation being of conventional nature and not being explicitly shown in FIG. 5. As multiplicand input signal thereto, the multiplier 132 is connected to receive the baseband DTV signal from the PAM receiver 2. As multiplier input signal thereto the multiplier 132 is connected to receive the sign bit of the later strong echo product signal supplied from the filter coefficients computer 13.

A digital adder 139 is connected for receiving, as a first of its two summand input signals, the more significant bits of the count from the address counter 135. The second summand input signal to the adder 139 is a control signal from the filter coefficients computer 13, which control signal specifies the differential delay D1 between the selected pair of strong echoes. The least significant bit of the count from the address counter 135 being ONE conditions the address multiplexer 136 to apply the sum output signal from the adder 139 to the read-and-then-write memory 131 as the addressing thereof. The least significant bit of the count from the address counter 135 being ONE conditions the read multiplexer 138 to supply the contents read from the addressed storage location in the memory 131 to the multiplier 133 as multiplicand input signal thereto. As multiplier input signal thereto, the multiplier 133 is connected to receive the sign bit of the earlier strong echo product signal supplied from the filter coefficients computer 13.

The adder 134 is connected to receive the product signals from the multipliers 132 and 133 as summand input signals. The least significant bit of the count from the address counter 135 being ONE conditions the write multiplexer 137 to apply the sum output signal from the adder 134 to the memory 131, to be written into the addressed storage location just read from, in place of the previous content. This is done pursuant to the read-and-then-write operation of the memory 131.

Figure 6A:
FIGS. 6A, 6B and 6C are diagrams of channel impulse responses in the time domain, used for illustrating that the response of a KFI filter is apt to differ from the response of a CIR-mirror filter.
Figure 6B:
Figure 6C:
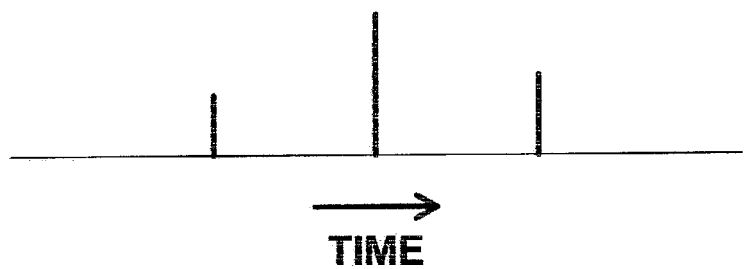

The combining of the CIR shown in FIG. 2A with the delayed CIR shown in FIG. 2B generates a modified CIR shown in FIG. 2C that resembles a mirror filter response. This resemblance is coincidental, and the response of the KFI filter 3 shaving the particular construction 30 shown in FIG. 4 or the particular construction 130 shown in FIG. 5 differs from a mirror filter response when the two components of the CIR are unequal in amplitude. The CIR shown in FIG. 6A has an earlier component that is smaller in amplitude than the later component of similar polarity. FIG. 6B shows that CIR delayed so its earlier component is temporally aligned with the later component of the FIG. 6A CIR. The FIG. 6C modified CIR, which results from adding the FIG. 6A CIR and the FIG. 6B delayed CIR together, is asymmetrical and clearly is not a mirror filter response.

Figure 7A:
FIGS. 7A, 7B and 7C are diagrams of channel impulse responses in the time domain, used for illustrating that the response of a KFI filter is apt to differ from the response of a CIR-mirror filter.
Figure 7B:
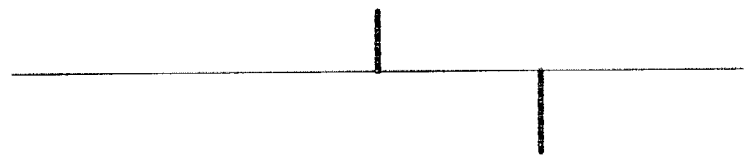
Figure 7C:

The combining of the CIR shown in FIG. 3A with the delayed CIR shown in FIG. 3B generates a modified CIR shown in FIG. 3C that resembles a mirror filter response. This resemblance is coincidental, and the response of the KFI filter 3 having the particular construction 30 shown in FIG. 4 or the particular construction 130 shown in FIG. 5 differs from a mirror filter response when the two components of the CIR are unequal in amplitude. The CIR shown in FIG. 7A has an earlier component that is smaller in amplitude than the later component of similar polarity. FIG. 7B shows that CIR delayed so its earlier component is temporally aligned with the later component of the FIG. 7A CIR. The FIG. 7C modified CIR, which results from differentially combining the FIG. 7A CIR with the FIG. 7B delayed CIR, is asymmetrical and clearly is not a mirror filter response.

Figure 8A:
FIGS. 8A, 8B and 8C are diagrams of channel impulse responses in the time domain, showing a poor way for the KFI filter to combine a variously delayed channel impulse response with three strong components.
Figure 8B:
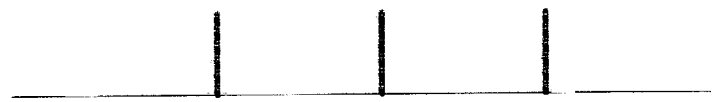
Figure 8C:

FIGS. 8A, 8B and 8C are diagrams of channel impulse responses plotted against a common time scale, which diagrams illustrate a less desirable way of combining differentially delayed received DTV signal comprising three strong multipath components. The CIR of the undelayed DTV signal shown in FIG. 8A comprises three strong multipath, components with the middle component delayed from the earliest component by the same delay as the latest component is delayed from the middle component. FIG. 8B shows the CIR of a DTV signal delayed from the undelayed DTV signal the CIR of which is shown in FIG. 8A, the delay being equal to the delay between the earliest and next multipath components. FIG. 8C shows the CIR of the DTV signal combining the DTV signals shown in FIGS. 8A and 8B. The FIG. 8C CIR undesirably still has two multipaths of equal strength larger than all other multipaths, rather than having a single strongest multipath stronger than all other multipaths.

Figure 9A:
FIGS. 9A, 9B and 9C are diagrams of channel impulse responses in the time domain, showing an alternative way for the KFI filter to combine the same variously delayed channel impulse response with three strong components, which alternative way is preferable to the way shown in FIGS. 8A, 8B and 8C.
Figure 9B:
Figure 9C:

FIGS. 9A, 9B and 9C are diagrams of channel impulse responses plotted against a common time scale, which diagrams illustrate a more desirable way of combining differentially delayed received-DTV signal comprising three strong multipath components. The CIR of the undelayed DTV signal shown in FIG. 9A, like that shown in FIG. 8A, comprises three strong multipath components with the middle component delayed from the earliest component by the same delay as the latest component is delayed from the middle component. FIG. 9B shows the CIR of a DTV signal delayed from the undelayed DTV signal the CIR of which is shown in FIG. 9A, the delay being equal to the delay between the earliest and latest multipath components. FIG. 9C shows the CIR of the DTV signal combining the DTV signals shown in FIGS. 9A and 9B. The FIG. 9C CIR has one principal multipath substantially stronger than all other multipaths.

Figure 10A:
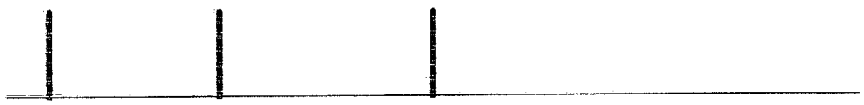
FIGS. 10A, 10B and 10C are diagrams of channel impulse responses in the time domain, showing a poor way for the KFI filter to combine another variously delayed channel impulse response with three strong components.
Figure 10B:
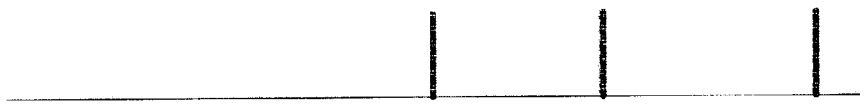
Figure 10C:
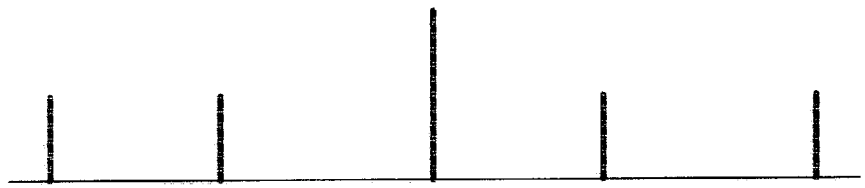

FIGS. 10A, 10B and 10C are diagrams of channel impulse responses plotted against a common time scale, which diagrams illustrate another less desirable way of combining differentially delayed received DTV signal comprising three strong multipath components. The CIR of the undelayed DTV signal shown in FIG. 10A comprises three strong multipath components with the middle component delayed from the earliest component less than the latest component is delayed from the middle component. FIG. 10B shows the CIR of a DTV signal delayed from the undelayed DTV signal the CIR of which is shown in FIG. 10A, the delay being equal to the delay between the earliest and latest multipath components. FIG. 10C shows the CIR of the DTV signal combining the DTV signals shown in FIGS. 10A and 10B. The FIG. 10C CIR has one principal multipath substantially stronger than all other multipaths.

Figure 11A:
FIGS. 11A, 11B and 11C are diagrams of channel impulse responses in the time domain, showing an alternative way for the KFI filter to combine the same other variously delayed channel impulse response with three strong components, which alternative way is preferable to the way shown in FIGS. 10A, 10B and 10C.
Figure 11B:
Figure 11C:
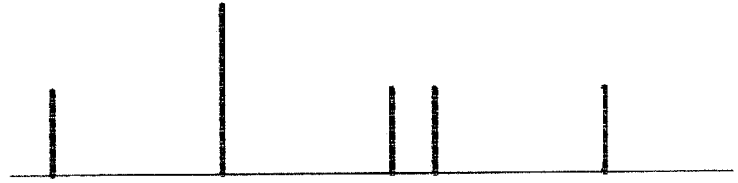

FIGS. 11A, 11B and 11C are diagrams of channel impulse responses plotted against a common time scale. These diagrams illustrate a preferable way of combining differentially delayed received DTV signal comprising three strong multipath components with the middle component delayed from the earliest component less than the latest component is delayed from the middle component. The CIR of the undelayed DTV signal shown in FIG. 11A is like that shown in FIG. 10A. FIG. 11B shows the CIR of a DTV signal delayed from the undelayed DTV signal the CIR of which is shown in FIG. 11A, the delay being equal to the delay between the earliest and next multipath components. FIG. 11C shows the CIR of the DTV signal combining the DTV signals shown in FIGS. 11A and 11B. The FIG. 11C CIR has one principal multipath substantially stronger than all other multipaths, but is preferable to the FIG. 10C CIR because more of the lesser-strength multipaths are post-echoes rather than pre-echoes. FIR filtering is required to suppress pre-echoes so repeats are generated; and the growth of random noise tends to be a problem. Substantially delayed post-echoes can be suppressed by IIR filtering without repeats being generated, and decision feedback can avoid the growth of random noise in the filtering of post-echoes.

Figure 12:
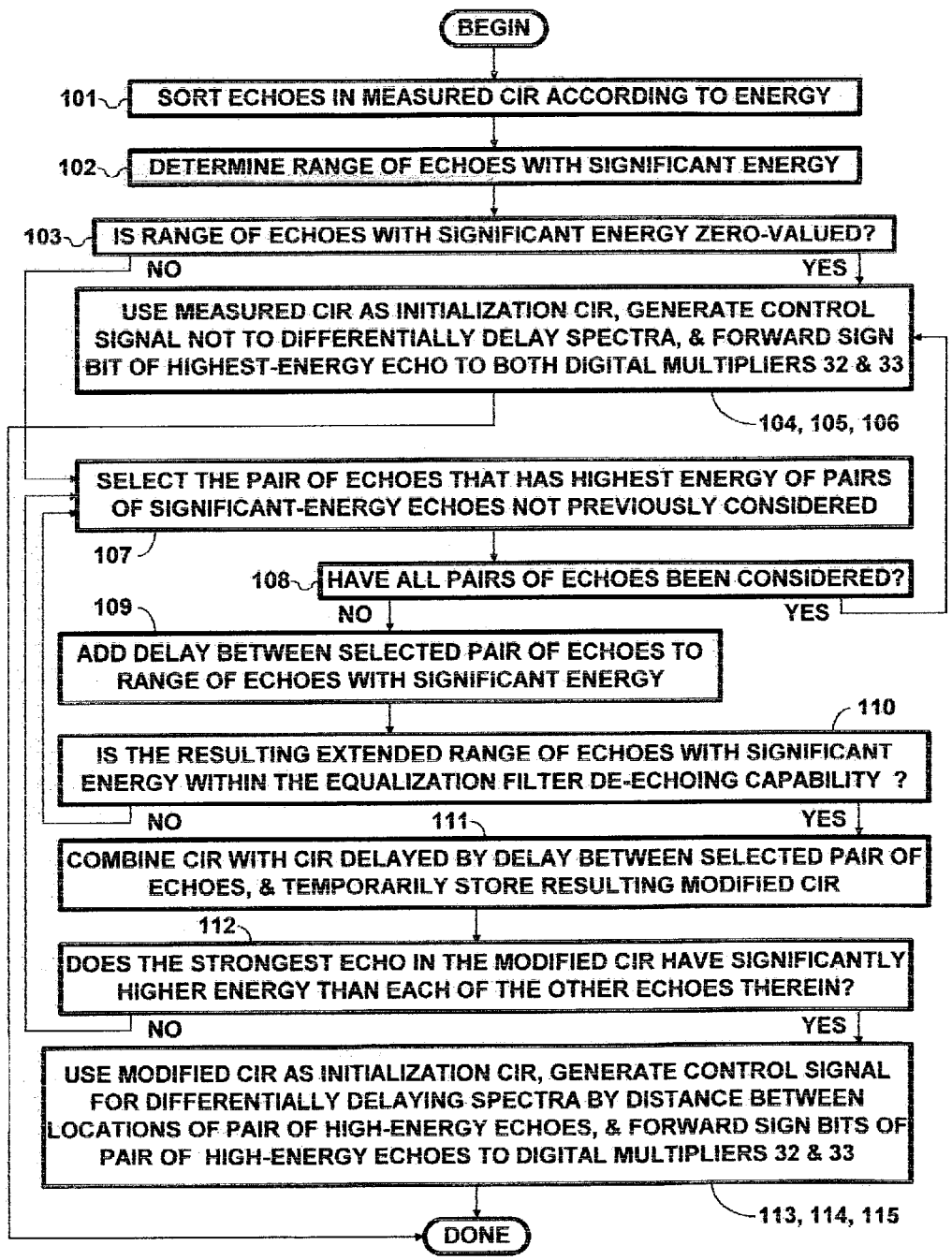
FIG. 12 is a flowchart illustrating how control signals are generated for either of the K-factor-improvement filters of FIGS. 4 and 5.

FIG. 12 is a flow chart of the computational routine that the filter-coefficients computer 13 uses in generating the control signals applied to the KFI filter 3, presuming it to have the construction 30 shown in FIG. 4. (The filter-coefficients computer 13 uses a very similar computational routine for generating the control signals applied to the KFI filter 3 if it has the construction 130 shown in FIG. 5.) The routine begins with an initial step 101 of sorting the echoes in the measured CIR supplied from the CIR measurement apparatus 14 and temporarily stored in a CIR register within the filter coefficients computer 13, the sorting being done according to the strengths of those echoes.

After step 101 a step 102 is performed for determining the range of echoes with significant energy. A fairly large fraction—e.g., one-half—of the energy of the strongest echo is established as a threshold that the energy of an echo must exceed in order to be considered significant. The earliest and latest locations in the measured CIR temporarily stored in a CIR register within the filter coefficients computer 13 that contain an echo of significant energy are determined. The time difference between those locations in the CIR register is then computed to determine the range of echoes with significant energy.

After step 102 a decision step 103 is made concerning whether or not the range of echoes with significant energy is zero-valued. If the decision in the step 103 is yes, that the range of echoes with significant energy has no duration and is therefore zero-valued, steps 104, 105 and 106 are performed in any order. In the step 104 the computer 13 uses the measured CIR temporarily stored in the CIR register as an initialization CIR from which to compute initial values of the weighting coefficients for the FIR filters 5 and 11 in the channel-equalization and echo-suppression filtering. The steps 105 and 106 condition the KFI filter 3 to operate merely as a digital delay line. The step 105 generates a control signal that is supplied to the KFI filter 3 for conditioning the programmable-bulk-delay circuitry 31 to exhibit no delay and conditioning the programmable-bulk-delay circuitry 35 to exhibit maximum delay. Step 106 includes a substep of extracting the sign bit indicating the polarity of the echo in the CIR temporarily stored in the register 37 determined to be the strongest in step 101. That sign bit is then forwarded to each of the digital-multipliers 32 and 33 in the KFI filter 30 as its respective multiplier signal. After the steps 104, 105 and 106 are completed, the FIG. 12 routine reaches a DONE state.

If the decision in the step 103 is no, that range of echoes with significant energy is not zero-valued, but instead extends over time, a step 107 is performed of selecting the pair of echoes that has the highest energy of the pairs of significant-energy echoes not previously considered. The step 107 typically includes preliminary substeps of calculating the combined energy of all possible pairs of echoes with significant energy and sorting the pairs in accordance with their combined energy, which preliminary substeps are performed only once in the routine. A counter counts the number of times that the step 107 is performed during the FIG. 12 routine. The pairs of echoes with significant energy are selected in accordance with that count, with the pairs of echoes with higher combined energy being selected before those with lower combined energy The first time that the step 107 is performed, the selected pair of echoes will be the two echoes having respective energies higher than the energy of each other echo.

The step 107 is associated with a decision step 108 concerning whether all pairs of echoes with significant energy have already been considered. If the decision in the step 108 is yes, all pairs of echoes with significant energy have already been considered, the steps 104, 105 and 106 are performed and the FIG. 12 routine reaches a DONE state. This happens only if K-factor-improvement cannot be done, owing to no possible extension of the range of echoes with significant energy being within the de-echoing capability of the adaptive equalization filtering that succeeds the KFI filter 30.

If the decision in step 108 is no, all pairs of echoes with significant energy have not already been considered, a step 109 is performed of adding the delay between the selected pair of echoes with significant energy to the range of echoes with significant energy determined in step 102. The step 109 is followed by a decision step 110 concerning whether the extended range of echoes with significant energy resulting from the step 109 is within the de-echoing capability of the adaptive equalization filtering that succeeds the KFI filter

30. If the decision in the step 110 is no, the extended range of echoes with significant energy is not within the de-echoing capability of that adaptive equalization filtering, operation loops back to the step 107.

If the decision in the step 110 is yes, the extended range of echoes with significant energy is within the de-echoing capability of that adaptive equalization filtering, the FIG. 12 routine continues to a step 111 for generating an initialization CIR. In step 111 the measured CIR is combined with the measured CIR as delayed by the delay between the selected pair of echoes with significant energy last selected in step 106. This generates a modified CIR, which is temporarily stored in a register within the filter coefficients computer 13.

After step 111, a decision step 112 is performed, concerning whether the strongest echo in the modified (CIR has significantly higher energy than each of the other echoes therein. If the decision in the step 112 is no, the strongest echo in the modified CIR does not have significantly higher energy than each of the other echoes therein, operation loops back to the step 107.

If the decision in the step 112 is yes, the strongest echo in the modified CIR has significantly higher energy than each of the other echoes therein, steps 113, 114 and 115 are performed in any order. In the step 113 the computer 13 uses the modified CIR temporarily stored in one of its register as an initialization CIR from which to compute initial values of the weighting coefficients for the FIR filters 5 and 11 in the channel-equalization and echo-suppression filtering. The step 114 generates a control signal that is supplied to the KFI filter 30 for conditioning the programmable-bulk-delay circuitry 31 to exhibit delay equal to the delay between the selected pair of echoes with significant energy last selected in step 106. The step 115 extracts the sign bits descriptive of the polarities of the later and the earlier of this last selected pair of echoes with significant energy, and forwards them as respective multiplier signals to the digital multipliers 32 and 33 in the KFI filter 30. After the steps 113, 114 and 115 are completed, the FIG. 12 routine reaches a DONE state.

Figure 13:
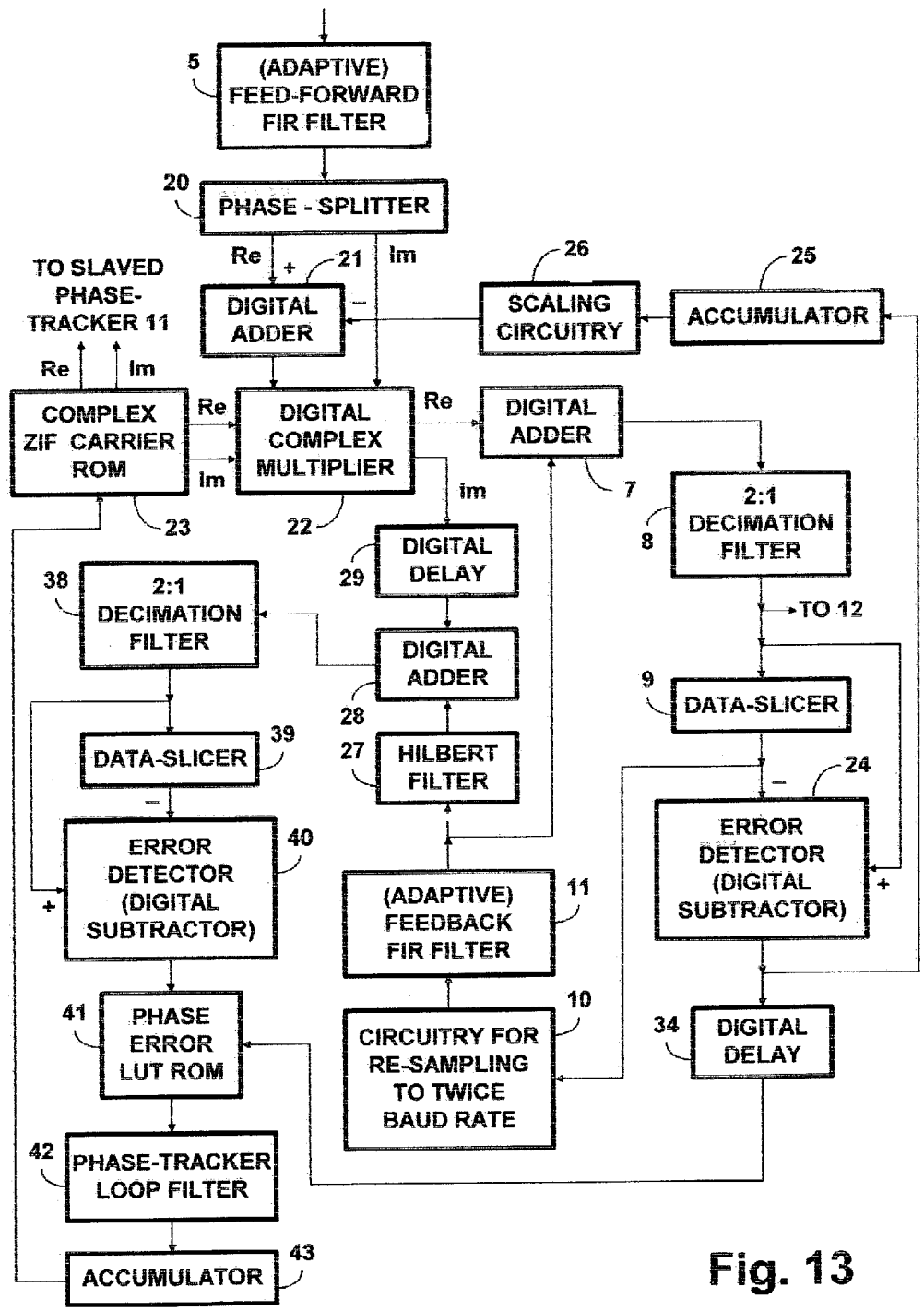
FIG. 13 is a schematic diagram showing details of one possible construction of the phase-tracker circuitry suitable for inclusion within the adaptive digital filtering of the FIG. 1 receiver.

FIG. 13 illustrates one of the ways for implementing he master phase-tracker 6 that is described in U.S. patent application Ser. No. 10/351,866. A phase-splitter 20 is connected to receive the real-only response of the feed-forward FIR filter 5 and to supply as the phase-splitter 20 response a complex delayed feed-forward FIR filter 5 response. For example, the phase-splitter 20 can constitute a Hilbert filter, for converting the real-only response of the feed-forward FIR filter 5 to an imaginary component of the complex delayed feed-forward FIR filter 5 response, and a digital delay circuit. This digital delay circuit delays the real-only response of the feed-forward FIR filter 5 in amount equal to the latent delay of the Hubert filter, thereby generating the real component of the complex delayed feed-forward FIR filter 5 response. A digital adder 21 operated as a subtractor is connected to receive this real component as its minuend input signal and to receive a residual direct component of baseband signal as its subtrahend input signal. A digital complex multiplier 22 is connected for receiving, as the real component of its multiplicand input signal, the difference output signal of the adder 21 operated as a subtractor. The complex multiplier 22 is connected for receiving, as the imaginary component of its multiplicand input signal, the imaginary component of the complex delayed feed-forward FIR filter 5 response from the phase-splitter 20. The complex multiplier 22 is connected for receiving digitized complex zero-intermediate-frequency (ZIF) carrier from read-only memory 23, as its multiplier input signal, which carrier is used for de-rotation that generates a complex product output signal from the complex multiplier 22 pursuant to a phase-tracking operation. The digital adder 7 is connected for receiving the real component of the complex product output signal as a real-only phase-tracker response to delayed feed-forward FIR filter 5 response. The digital adder 7 adds this real-only phase-tracker response to the real-only response of the feedback FIR filter 11 to generate a real-only-sum output signal supplied to the 2:1 decimation filter 8.

The response of the 2:1 decimation filter 8 is the real-only baud-rate equalizer response, from which the data-slicer 9 generates decisions as to what symbols were broadcast to the receiver. As noted in the previous description of the FIG. 1 receiver, circuitry 10 re-samples these decisions to twice baud rate and supplies the resulting decision-feedback signal to the feedback FIR filter 11 as its input signal. An error detector 24 is connected for comparing the baud-rate equalizer response from the 2:1 decimation filter 8 with the baud-rate decisions supplied from the data-slicer 9 to generate measurements of the-reception error in the real-only baud-rate equalizer response. The error detector 24 as shown in FIG. 12 is essentially a digital subtractor. This subtractor is connected to receive, as its minuend input signal, the baud-rate real-only equalizer response supplied by the 2:1 decimation filter 8. This subtractor is connected to receive, as its-subtrahend input signal, the baud-rate decisions supplied from the data-slicer 9. The subtractor is connected to supply its difference output signal as input signal to an accumulator 25, which accumulates the measurements of the reception error in the real-only baud-rate equalizer response. The automatic-gain-control (AGC) circuitry of the PAM receiver 2 is designed to regulate the gain of the real-only baud-rate equalizer response so the data-slicing levels are optimal. So, if the real-only baud-rate equalizer response is free of direct component, the measurements supplied from the error detector 24 should average to arithmetic zero over time. Scaling circuitry 26 responds to the more significant bits of any departure of the accumulation result from arithmetic zero to supply a subtrahend input signal to the digital sadder 21 operated as a subtractor. This subtrahend input signal adjusts the direct component of the real component of the digital adder 21 sum output signal to degenerate the direct component of the real-only baud-rate equalizer response.

The measurements the error detector 24 makes of the reception error in the real-only baud-rate equalizer response are also used in the phase-tracker. These measurements, together with measurements of the reception error in a delayed imaginary-only baud-rate equalizer response, are the basis for controlling the complex ZIF carrier that the digital complex multiplier 22 employs in the de-rotation of the complex delayed feed-forward FIR filter 5 response. That delayed imaginary-only baud-rate equalizer response is generated as follows. A Hilbert filter 27 is connected for receiving the real-only response of the feedback FIR filter 11 and for supplying the imaginary-only feedback FIR filter 11 response that-the filter 27 synthesizes as one of two summand input signals of a digital adder 28. The imaginary component of the complex product output signal from the complex multiplier 22 is delayed by digital delay circuitry 29 to compensate for the latent delay in the Hilbert filter 27 plus any latent delay in the cascade connection of elements 7–10. The digital delay circuitry 29 is connected to apply the delayed imaginary component of the complex product output signal to the adder 28 as the other of its summand input signals. The sum-output signal of the adder 28 is delayed imaginary-only equalizer response sampled at twice baud rate. A 2:1 decimation filter 38 similar in construction to the 2:1 decimation filter 8 is-connected to receive the sum output signal from the adder 28 and to supply the delayed imaginary-only baud-rate equalizer response.

A data-slicer 39, similar in construction to the data-slicer 9 is connected for quantizing the delayed imaginary-only baud-rate equalizer response An error detector 40 is connected for comparing the baud-rate delayed imaginary-only equalizer response from the 2:1 decimation filter 38 with the baud-rate decisions supplied from the data-slicer 39 to generate measurements of the reception error in the delayed imaginary-only baud-rate equalizer response. The error detector 40 as shown in FIG. 13 is essentially a digital subtractor that supplies, as its difference output signal, measurements of the reception error in the delayed imaginary-only baud-rate equalizer response. This subtractor is connected to receive, as its minuend input signal, the baud-rate delayed imaginary-only equalizer response supplied by the 2:1 decimation filter 38. This subtractor is connected to receive, as its subtrahend input signal, the baud-rate decisions supplied from the data-slicer 39. The subtractor is connected to supply its difference output signal as a portion of the input address of a read-only memory 41 that stores a look-up table (LUT) for phase error in the phase-tracker. A digital delay circuit 42 delays the measurements that the error detector 24 supplies of the reception error in the real-only baud-rate equalizer response, so as to be contemporaneous with the measurements of tie reception error in the delayed imaginary-only baud-rate equalizer response. The digital delay circuit 42 is connected to supply the phase-error LUT ROM 41 with delayed real-only baud-rate equalizer response as the remaining portion of the ROM 41 input address The phase-error LUT ROM 41 is connected to supply phase-error input signal to a phase-tracker loop filter 43. The response of the phase-tracker loop filter 43 is supplied to an accumulator 44 that generates input addressing for the complex ZIF carrier ROM 22, completing the phase-tracker loop.

U.S. Pat. No. 5,406,587 issued Apr. 11, 1995 to T. P. Horwitz et alii and titled "Error Tracking Loop" describes a phase-tracker connected following an equalizer. U.S. Pat. No. 5,533,071 issued Jul. 2, 1996 to G. Krishnamurthy et alii and titled "Error Tracking Loop Incorporating Simplified Cosine Look-up Table" discloses variant of this phase-tracker, also connected to follow an equalizer. The phase-error LUT ROM 41 is similar in design to those used in the phase-trackers described in U.S. Pat. Nos. 5,406,587 and 5,533,071 The phase-tracker loop filter 43 determines the frequency response of the phase-tracker loop analogously to what a filter termed a "phase-lock loop filter" does in U.S. Pat. Nos. 5,406,587and.5,533,071. The phase-tracker loop filter 43 is chosen to suppress phase noise as high as 30 kHz.

Figure 14:
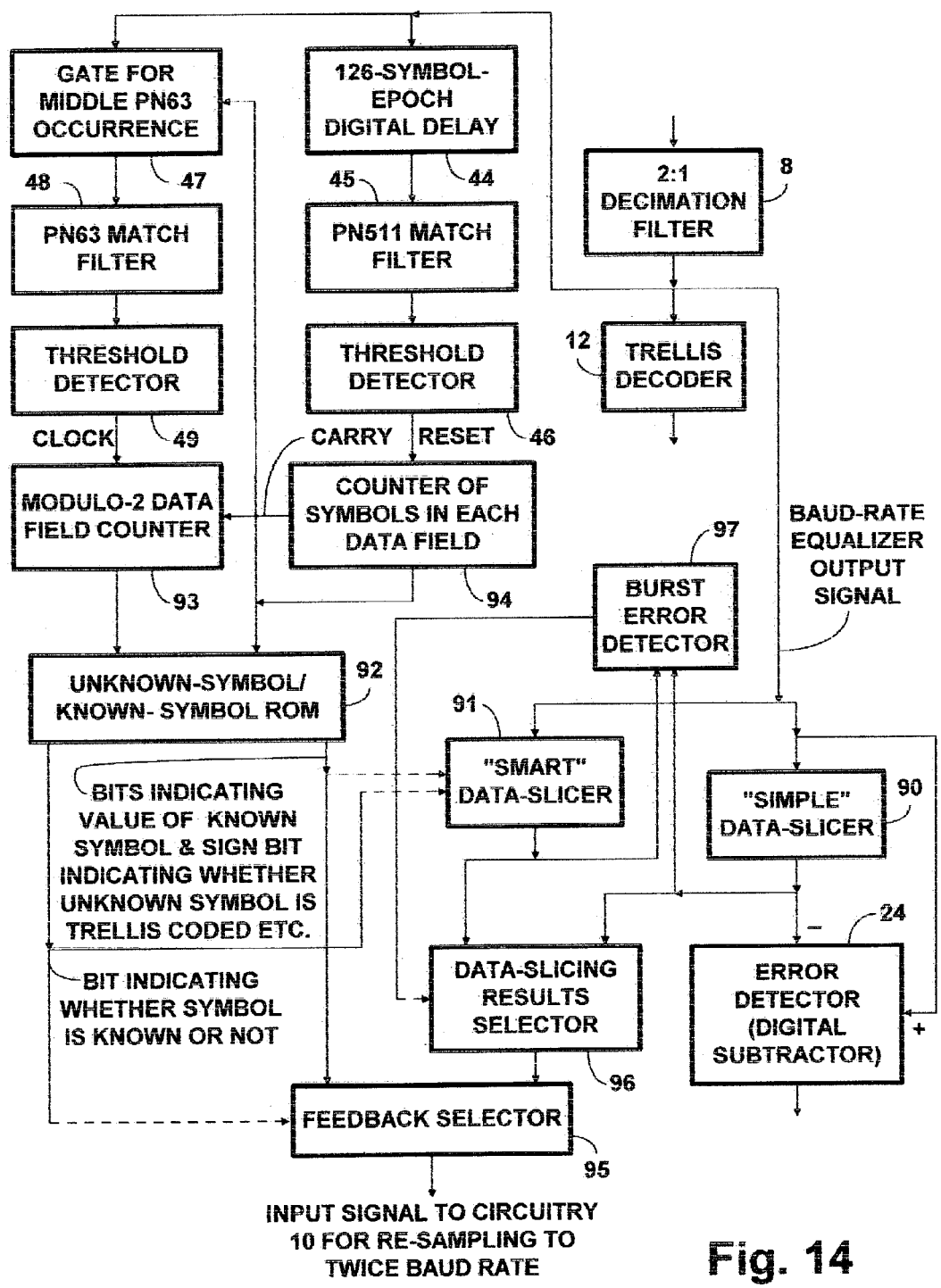
FIG. 14 is a schematic diagram showing details of a preferred construction for a data-slicer used in the FIG. 1 receiver for generating decision-feedback signal in IIR equalization filtering.

FIG. 14 shows in greater detail a preferred construction for the data-slicer 9 that FIGS. 1 and 13 show for deriving the feedback signal supplied to the circuitry 10 for re-sampling to twice baud rate. When the IIR filtering used for suppressing post-echoes is being designed, a basic concern is to reduce delay in the recursion path(s) so that even shorter-delay post-echoes can be suppressed. The circuitry for making the decisions fed back in a decision-feedback equalizer (DFE) should make these decisions in as short a time as possible to avoid such delay. A "simple" data-slicer 90 that just quantizes the baud-rate equalizer output signal supplied from the 2:1 decimation filter 8 generates considerable error when the signal-to-noise ratio (SNR) of the output signal from the PAM receiver 2 is reduced because of increased Johnson noise in the amplified intermediate-frequency signal. A "smart" data-slicer 91 of a type described in U.S. Pat. No. 6,178,209 issued Jun. 19, 1998 to S. N. Hulyalkar et alii and titled "Method of Estimating Trellis Encoded Symbols Utilizing Simplified Trellis Decoding" makes decisions within one sample epoch or less. When the SNR of the output signal from the PAM receiver 2 is reduced, the "smart" data-slicer 91 estimates the transmitted symbols with fewer decision errors than the "simple" data-slicer 90. The "smart" data-slicer 91 uses prediction based on the properties of trellis decoding to improve the estimates of the transmitted symbols over those available from the "simple" data-slicer 90, which does not employ prediction in making symbol decisions. However, the "smart" data-slicer 91 is subject to running error when burst error occurs and for some time thereafter. Furthermore, the "smart" data-slicer 91 supplies estimates of the transmitted symbols only for the trellis-coded portions of the baud-rate equalizer output signal supplied at baseband. During the data field synchronizing (DFS) signals and during the data segment synchronizing (DSS) signals, clocking through the "smart" data-slicer 91 is suspended, and no decisions concerning the contents of the DFS and DSS signals are provided by the "smart" data-slicer 91. Decisions concerning the contents of the DFS and DSS signals could be made by the "simple" data-slicer 90. However, the estimates of the transmitted symbols furnished by the "simple" data-slicer 90 during the DFS and DSS signals are more likely to be in error than estimates of their known symbols read from a read-only memory (ROM) 92. So, the "simple" data-slicer 90 is operated so as not to clock forward decisions concerning the contents of the DFS and DSS signals.

The ROM 92 receives as its input addressing a count of the symbols in each data frame. This count comprises a modulo-two count of data fields, which count is supplied by a counter 93, and a count of the symbols in each data field, which count is supplied by a counter 94. The ROM 92 stores a plurality of bits at each of its addressed storage locations. One of the bits indicates whether the corresponding symbol in the baud-rate equalizer response is known or unknown. The symbols in the DSS signals are known. The symbols in the PN511 sequence and in the triple PN63 sequence in the initial data segment of each data field are known. If additional training signal is employed in the final data segment of each data field, the symbols in that additional training signal are known. The remaining bits at each of the addressed storage locations in the ROM 92 indicate the value of the corresponding symbol in the baud-rate equalizer response, if it is a known symbol. If the symbol is not known, the remaining bits indicate whether the unknown symbol is trellis-coded or not. E.g., the sign bit can indicate whether the unknown symbol is trellis-coded or not. If the symbol is not known, the remaining bits can also encode further trellis decoding instructions.

A feedback selector 95 selects one of two signals as decision-feedback signal to the circuitry 10 for re-sampling, the selection being made responsive to the bit from the ROM 92 indicating whether the corresponding symbol in the baud-rate equalizer response is known or unknown. If the value of this selection-control bit indicates the symbol is known, the feedback selector 95 selects the known value of the symbol read from the ROM 92 to be the decision-feedback signal. If the value of this selection-control bit indicates the symbol is unknown, the feedback selector 95 selects an estimation of the symbol provided by a data-slicing results selector 96 to be the decision-feedback signal.

The data-slicing results selector 96 is connected for selecting between the data-slicing results supplied from the "simple" data-slicer 90 and the "smart" data-slicer 91, the selection being made responsive to the output signal of a burst error detector 97. When the burst error detector 97 output signal indicates absence of burst error, this indication conditions the data-slicing results selector 96 to select the data-slicing results supplied from the "smart" data-slicer 91 as the input signal that it supplies to the feedback selector 95. The "smart" data-slicer 91 uses prediction based on the properties of trellis-decoding to improve the estimates of the transmitted symbol over those available from the "simple" data-slicer 90, which does not employ prediction in making symbol decisions. Accordingly, the "smart" data-slicer 91 is subject to running error when burst error occurs and for some time thereafter. So, when the burst error detector 97 output signal indicates the presence of burst error; the data-slicing results selector 96 selects the data-slicing results supplied from the "simple" data-slicer 90 as the input signal that it supplies to the feedback selector 95.

The synchronization of the counts from the counters 93 and 94 to the frames of symbols in the baud-rate equalizer output signal can proceed in the following way. The baud-rate equalizer output signal from the 2:1 decimation filter is delayed one hundred twenty-six symbol epochs by digital delay circuitry 44 to provide the input signal for a PN511 match filter 45. A threshold detector 46 detects when a significant peak occurs in the response of the PN511 match filter 45 as a PN511 sequence occurring in the DFS signal at the beginning of a data field concludes in the delayed equalizer output signal supplied from the digital delay circuitry 44. Responsive to detecting that peak, the threshold detector 46 generates a reset signal for the counter 94 that counts the symbols in each data field. The counter 94 does this symbol counting in response to a baud rate clock signal from a source of such signal, which-connection is not explicitly shown in FIG. 12.

A gate 47 selectively supplies the baud-rate equalizer output signal to a PN63 match filter 48 when the middle PN63 sequence should occur in the DFS signal. The gate 47 selects the middle PN63 sequence responsive to whether or not the count from the counter 94 approaches the count of the number of symbols in a data frame closer than sixty-four. A threshold detector 49 detects when a significant peak occurs in the response of the PN63 match filter 48 as the middle PN63 sequence occurring in the DFS signal at the beginning of a data frame concludes. The application of the baud-rate equalizer output signal from the 2:1 decimation filter 8 to the PN511 match filter 45 is delayed one hundred twenty-six symbol epochs by the digital delay circuitry 44. Accordingly, the significant peak occurs in the response of the PN63 match filter 48 at the same time that a significant peak occurs in the response of the PN511 match filter 45. Responsive to detecting the peak in the response of the PN63 match filter 48, the threshold detector 49 generates a reset signal for the counter 93 that counts data fields modulo-two responsive to carries from the counter 94 that counts symbols per data field. The reset signal for the counter 93 forces its count to zero. The counters 93 and 94 are reset to zero counts simultaneously at the conclusion of the middle PN63 sequence occurring in the DFS signal at the beginning of a data frame. The location of known symbols and their values is reckoned from that temporal reference point when generating the look-up tables stored in the ROM 92.

Figure 15:
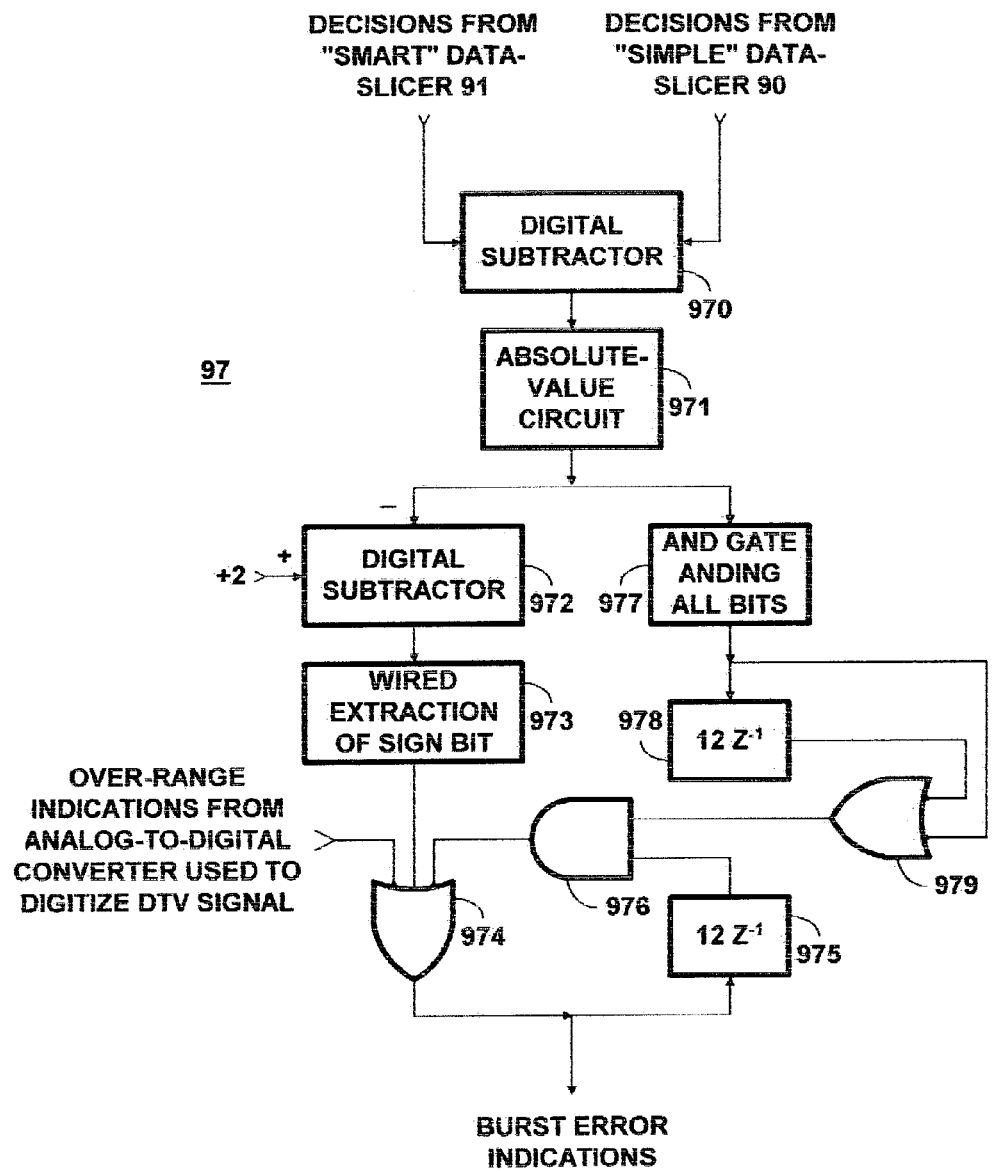
FIG. 15 shows in greater detail how a burst error detector used as a component of the FIG. 14 data-slicer can be constructed.

FIG. 15 shows in greater detail how the burst error detector 97 can be constructed. When the noise from the baud-rate equalizer response from the 2:1 decimation filter 8 is essentially all-white Gaussian noise (AWGN), the symbol decisions made by the "smart" data-slicer 91 will be as good as or better than the symbol decisions made by the "simple" data-slicer 90. When SNR falls to where noise peaks frequently exceed one to two times the energy difference between adjacent digital modulation levels the symbol decisions made by the "smart" data-slicer 91 will be appreciably better than the symbol decisions made by the "simple" data-slicer 90. The symbol decisions made by the "simple" data-slicer 90 are apt to be in error by one digital modulation level. When SNR falls to where noise peaks frequently exceed twice the energy difference between adjacent digital modulation levels, the symbol decisions made by the "smart" data-slicer 91 are less likely to be so much better than the symbol decisions made by the "simple" data-slicer 90. Furthermore, the condition where the concurrent symbol decisions respectively made by the "smart" data-slicer 91 and by the "simple" data-slicer 90 differ by more than the energy difference between adjacent digital modulation levels is likely to be associated with the occurrence of burst noise, if AWGN rarely exceeds that energy difference.

Within the burst error detector 97, a digital subtractor 970 is connected for subtracting each symbol decision made by one of the data-slicers 90 and 91 from the symbol decision concurrently made by the other of the data-slicers 90 and 91. Per convention, the energy difference between adjacent digital modulation levels of an 8VSB signal is presumed to have a normalized amplitude value of two. An absolute-value circuit 971 is connected to receive as its input signal the difference output signal of the subtractor 970 and to supply a measure of the absolute difference between the symbol decisions made by the data-slicers 90 and 91. A digital subtractor 972 using two's complement arithmetic is connected to subtract this absolute difference from plus four, plus four being twice the energy difference between adjacent digital modulation levels of an 8VSB signal. The subtractor 972 functions as a comparator, with the sign bit of its difference output signal-being ZERO if the absolute difference between the symbol decisions made by the data-slicers 90 and 91 is no more than two digital modulation levels. The sign bit of the subtractor 972 difference output signal is ONE if the absolute difference between the symbol decisions made by the data-slicers 90 and 91 is more than two digital modulation levels. There is a wired extraction 973 of the sign bit of the subtractor 972 difference output signal for application to an OR gate 974 as one of the input signals thereof. The logic response of the OR gate 974 is the output signal from the burst error detector 97. The OR gate 974 logic response being ZERO conditions the data-slicing results selector 96 to select the data-slicing results from the "smart" data-slicer 91 to the feedback selector 95. A ONE logic response from the OR gate 974 conditions the data-slicing results selector 96 to select the data-slicing results from the "simple" data-slicer 9 to the feedback selector 95.

With the 12-phase trellis coding employed in HDTV signals when broadcasting is done in accordance with A/53, an error in any of the twelve phases of trellis coding results from the "smart" data-slicer 91 is likely to recur for some time at twelve-symbol-epoch intervals. If the OR gate 974 response is a ONE, indicating burst error, the data-slicing results from the "simple" data-slicer 90 will be selected to the feedback selector 95. Preferably, this selection is not only made during a current symbol epoch, but also every twelfth symbol epoch thereafter until it is ascertained that the "smart" data-slicer 91 has corrected any running error in its data-slicing results.

Accordingly, a 12-symbol-epoch digital delay circuit 975 is connected for delaying the logic response from the OR gate 974 by twelve symbol epochs, and a two-input AND gate 976 is connected for conditionally applying the delayed OR gate 974 response to the OR gate 974 as a second input signal. An AND gate 977 is connected for ANDing all the bits of the absolute-value circuit 44 response to generate a logic ONE if and only if that response is arithmetic zero. A twelve-symbol-epoch digital delay circuit 978 is connected for delaying the logic response from the AND gate 977. An OR gate 979 is connected for responding to the AND gate 977 response and that response as delayed twelve symbol epochs by the digital delay circuit 978.

The AND gate 977 logic response being ONE indicates that the current decision made by the "smart" data-slicer 91 differs from the current decision made by the "simple" data-slicer 90. Presumably, this is an indication that any running error in decisions from the "smart" data-slicer 91 has-not yet been corrected. If the delayed AND gate 977 logic response that the delay circuit 978 provides as its output signal is ONE, this indicates that the last previous decision made by the "smart" data-slicer 91 differs from the last previous decision made by the "simple" data-slicer 90. Presumably, this is an indication that any running error in decisions from the "smart" data-slicer 91 may not yet have been corrected. Responsive to either of these indications of running error in the data-slicing results from the "smart" data-slicer 91, the OR gate 979 supplies a logic ONE response as second input signal to the AND gate 976. This conditions the AND gate 976 to supply the OR gate 974 an input signal that reproduces the OR gate 974 response from twelve symbols previous.

The AND gate 977 logic response being ZERO indicates that the current decisions made by the "smart" data-slicer 91 and by the "simple" data-slicer 90 are the same. Presumably, this is an indication that any running error in decisions from the "smart" data-slicer 91 may have been corrected. If the delayed AND gate 977 logic response that the delay circuit 978 provides as its output signal is ZERO, this indicates that the last previous decision made by the "smart" data-slicer 91 was the same as the last previous decision made by the "simple" data-slicer 90. Presumably, this is a further indication that any running error in decisions from the "smart" data-slicer 91 may have been corrected. Responsive to both of these indications of any running error in the data-slicing results from the "smart" data-slicer 91 probably having been corrected, the OR gate 979 supplies a logic ZERO response as second input signal to the AND gate 976. The logic ZERO response from the OR gate 979 is considered to be a conclusive indication that the data-slicing results from the "smart" data-slicer 91 are correct. The logic ZERO response from the OR gate 979 conditions the AND gate 976 to generate a ZERO logic response of its own. The AND gate 976 supplies its ZERO logic response to the OR gate 974 as an input signal thereto, rather than supplying the OR gate 974 with an input signal that reproduces the OR gate 974 response from twelve symbols previous.

The PAM receiver 2 can be arranged to supply other indications that running error is quite likely in the data-slicing results from the "smart" data-slicer 91, which indications are applied to the OR gate 974 as another input signal thereto. E.g., FIG. 15 shows indication of over-ranging in the analog-to-digital converter used in the PAM receiver 2 to digitize DTV signal being applied to the OR gate 974 as another input signal thereto. Such over-ranging is a likely consequence of impulse noise that will cause burst noise in the baud-rate-equalizer response and that will quite likely cause running error in the data-slicing results from the "smart" data-slicer 91.

In Kalman filtering the filter coefficients computer 13 responds to the reception errors detected by the error detector 24 to update the filter, coefficients incrementally using an auto-regression procedure that does not rely on CIR measurement. The applicant prefers an alternative type of adaptive channel-equalization and echo-suppression filtering in which an initial measurement of the CIR is updated responsive to reception errors detected by the error detector 24, so as to track current reception conditions. Periodically, the weighting coefficients of the equalization filters are re-calculated based on a strobe of the continually updated CIR. J. D. MacDonald and A. L. R. Limberg describe such an alternative approach in their U.S. patent application Ser. No. 10/271,386 filed 15 Oct. 2002 and titled "Adaptive Equalization of Digital Modulating Signal Recovered from Amplitude-Modulated Signal Subject to Multipath". This application issued 23 May 2006 as U.S. Pat. No. 7,050,491. The strobe of the continually updated CIR can also be used for adapting the parameters of the KFI filter 3, so changes in multipath reception conditions are more closely tracked.

Figure 16:
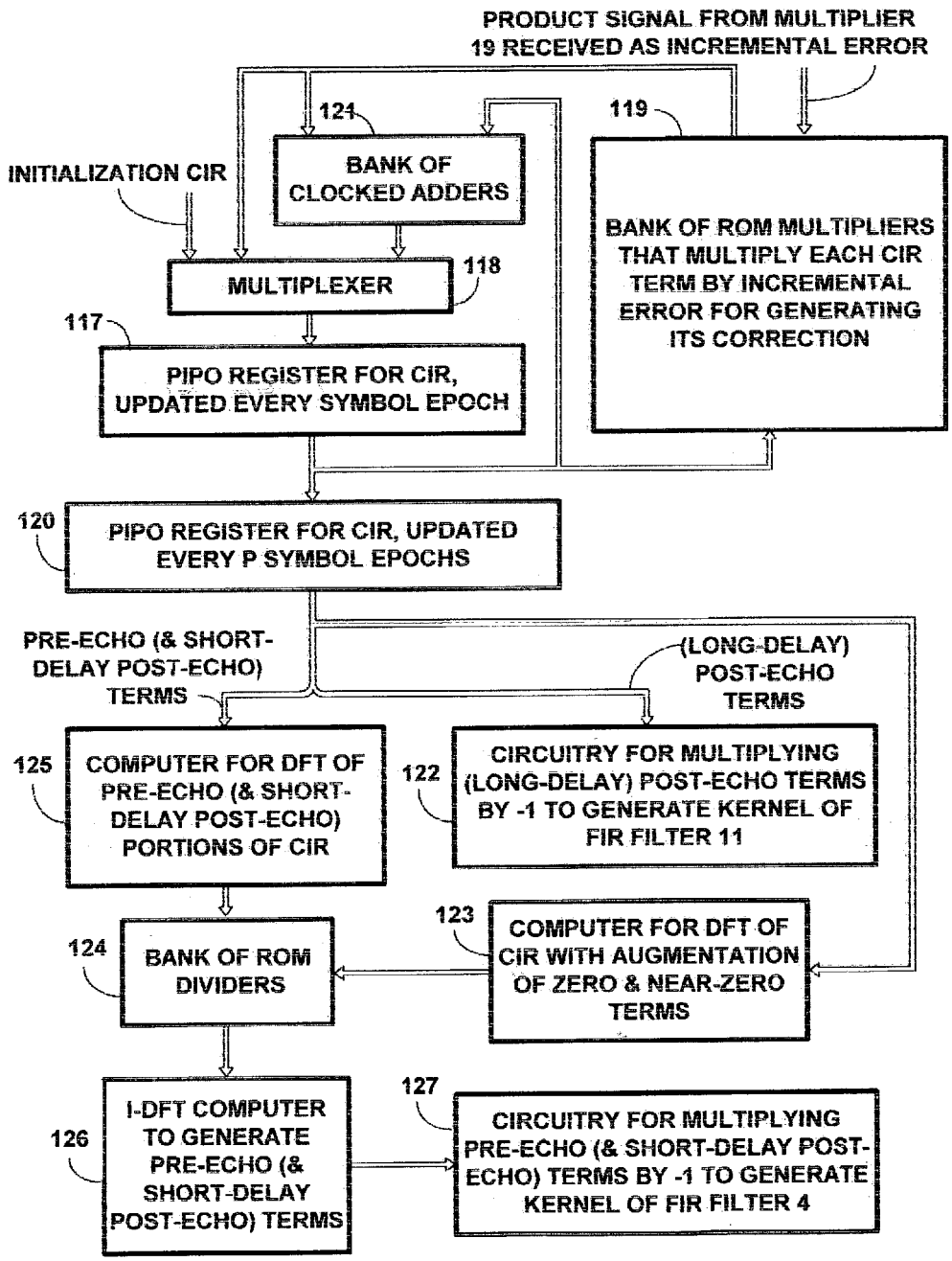
FIG. 16 is a schematic diagram showing details of a portion of a filter coefficients computer that is included in some constructions of the FIG. 1 receiver.

FIG. 16 depicts details of a construction of the portion of the filter coefficients computer 13 used for implementing such an approach. A CIR register 117 in the filter coefficients computer 13 stores the cepstrum—i.e., the transmission/reception channel impulse response (CIR) in the time domain. The CIR temporarily stored in the CIR register 117 is continually updated. Every P symbol epochs the CIR stored in the CIR register 117 at that time is used as the basis for generating a normalized CIR, in which the principal multipath component, or "cursor" component has +1 value.

FIG. 16 shows the CIR register 117 as a parallel-in, parallel-out (PIPO) register, the parallel loading of which is done via a multiplexer 118. The CIR register 117 is commanded to clear its previous contents and load new contents, in an overwrite procedure which is done for each symbol in the equalizer output signal supplied from the 2:1 decimation filter 8 in FIG. 1. When a new DTV channel is first received or when adaptive equalizer tracking is lost, the multiplexer 118 is conditioned near the conclusion of a data field to reproduce the initialization CIR generated by the procedures shown in the FIG. 12 flow chart. The multiplexer 118 reproduces the initialization CIR for parallel loading into the cleared CIR register 117. Then, a bank 119 of read-only-memory multipliers multiplies each of the terms of the CIR temporarily stored in the CIR register 117 by the reciprocal of the amplitude of the principal "cursor" term to generate a normalized CIR that is loaded into another parallel-in, parallel-out (PIPO) register 120.

Thereafter, each symbol in the equalizer output signal supplied from the 2:1 decimation filter 8 for the next P symbol epochs is analyzed by the error detector 18 to generate estimated error in each successive symbol. The digital multiplier 19 multiplies the estimated reception error in each successive symbol by an attenuation factor $-\mu$ to generate a factor that the bank 119 of ROM multipliers uses to multiply each term of the CIR stored in the CIR register 117. This generates a respective incremental correction that will be used for updating the CIR temporarily stored in the CIR register 117. Each of the terms of the CIR temporarily stored in the CIR register 117 and its incremental correction is supplied to a respective one of a bank 121 of clocked digital adders. The multiplexer 118 is conditioned to reproduce the sum output terms clocked forward from the bank 121 of digital adders, for accumulating the previous contents of the CIR register 117 with respective incremental corrections to update those previous contents.

Every P symbol epochs, in a step, carried out between clock signals for the bank 121 of clocked digital adders, the bank 119 of read-only-memory multipliers multiplies each of the terms of the CIR then temporarily stored in the CIR register 117 by the reciprocal of the amplitude of the principal "cursor" term. This generates a normalized CIR that is loaded into the parallel in, parallel-out (PIPO) register 133 for updating its contents. P is a number at least a few hundred and preferably not appreciably larger than half the number of terms in the discrete Fourier transforms that the filter coefficients computer 13 employs in its computation procedures. P is conveniently made equal to 832, since this facilitates comparing the CIR stored in the CIR register 121 at the beginning of a data field with the CIR measured by the CIR measurement apparatus 14. This comparison can be used as a basis for deciding whether or not the weighting coefficients in the FIG. 1 adaptive equalizer should be re-initialized. Moreover, with respect to the invention, this comparison can be used as a basis for deciding whether or not the KFI filter 3 should be re-adjusted.

With a P of 832, the speed of tracking dynamic multipath conditions is faster than is generally needed. Larger values of P reduce processing speeds and conserve power. The A/53 data field has 313 data segments of 832 symbols. Since 313 is prime, P cannot be made a multiple of 832. However, supposing 4096-term DFTs are employed, P can be made 4 times 313, or 1252, to facilitate the CIR stored in the CIR register 121 at the beginning of a data field being compared on regular interval with the CIR measured by the CIR measurement apparatus 14. With slight risk of wrap-around effects in the 4096-term DFTs, P may instead be made 8 times 313, or 2504.

The post-echo terms of the CIR temporarily stored in the CIR register 133 are multiplied by minus one in circuitry 122. This generates the weighting coefficients supplied to the coefficients register of the adaptive feedback FIR filter 11. The IIR filtering performed by the adaptive feedback FIR filter 11 responding to decision-feedback signal cancels all post-echoes, but pre-echoes remain to be suppressed by FIR filtering performed by the adaptive feed-forward FIR filter 5.

Although FIG. 16 does not explicitly show it, the cursor term of the CIR temporarily stored in the CIR register 133 is applied as a weighting coefficient to a suitable location in the coefficients register of the adaptive feed-forward FIR filter 5. The pre-echo terms of the CIR temporarily stored in the CIR register 133 could simply be multiplied by minus unity and applied as weighting coefficients to suitable locations in the coefficients register of the adaptive feed-forward FIR filter 5. However, unless the received signal has very little multipath distortion, a problem arises when this done. The problem is especially evident if there is a larger number of echoes of substantial energy in the received DTV signal. The problem is caused by the fact that the signals being differentially combined to cancel pre-echoes are themselves are apt to include post-echoes of preceding signals and pre-echoes of succeeding signals, rather than being echo-free. U.S. patent application Ser. No. 10/271,386 filed Oct. 15, 2002 teaches how to suppress the effect of these echoes. The CIR is used to generate the deconvolution result for a DTV signal transmitted with flat frequency response and received through the actual transmission/reception channel. Incidentally, this deconvolution result generates the terms of an impulse response descriptive of an FIR filter that accounts for the echo-suppression components including post-echoes of preceding signals and pre-echoes of succeeding signals. While an FIR filter of this type could be employed as equalizer, the FIG. 1 adaptive equalizer uses an IIR filter to cancel the post-echoes of preceding signals using decision feedback. This reduces noise in the equalizer output signal and improves stability of the IIR filter recursion loop including the feedback FIR filter 11. So, this deconvolution result that accounts for the echo-suppression components including post-echoes of preceding signals and pre-echoes of succeeding signals is convolved with the pre-echo only portion of the CIR. This convolution synthesizes the terms of a "synthetic" normalized CIR that accounts for the echo-suppression components echoes. The calculation of the impulse response of the FIR filter, as modified so as to account for the echo-suppression components including echoes, is more easily implemented using discrete Fourier transform (DFT) methods.

Accordingly, in FIG. 16 a component computer 123 computes the discrete Fourier transform (DFT) of each normalized CIR temporarily stored in the CIR register 133 to determine the channel impulse response in the frequency domain. This DFT provides the divisor terms for a bank 124 of read-only-memory dividers that perform a term-by-corresponding-term division process in the frequency domain, which process corresponds to a de-convolution process in the time domain.

Term-by-corresponding-term division of a flat frequency-domain response (with all unity terms) by the DFT of the normalized CIR would generate the DFT of the overall response required of the FIG. 1 adaptive equalizer. If the DFT of the normalized CIR exhibits nulls for some frequency terms, the corresponding terms in the overall response of the FIG. 1 adaptive equalizer would be excessively boosted, leading to unacceptable exaggeration of noise components at the null frequencies. Accordingly, any terms of the DFT of the normalized CIR that the component computer 123 computes that would be smaller than a prescribed value associated with acceptably small noise growth are augmented by the computer 123, so as to replace the originally computed value with that prescribed value.

The CIR register 133 is connected for supplying only the pre-echo terms of each normalized CIR temporarily stored therein to a component computer 125. The component computer 125 computes the DFT of the then-current pre-echo terms for application to the bank 124 of ROM dividers as respective dividend terms for the term-by-corresponding-term division process in the frequency domain that corresponds to a de-convolutional process in the time domain. The quotients from the bank 124 of ROM dividers specify a quotient DFT. A component computer 126 is connected to receive this DFT from the bank 124 of ROM dividers. The component computer 126 computes the inverse discrete Fourier transform (I-DFT) of the quotient DFT to synthesize the synthetic normalized CIR that is the impulse response in the time-domain that is to be compensated against by the feed-forward FIR filter 5. The echo terms of this synthetic normalized CIR are multiplied by minus one in circuitry 127 to generate weighting coefficients for suitable locations in the coefficients register of the adaptive feed-forward FIR filter 5.

In the claims that follow, the specification of "a K-factor-improved filter having a sparse kernel with two non-zero weighting coefficients of substantially equal amplitudes" is to be constructed to include a K-factor-improvement filter having a sparse kernel with two non-zero weighting coefficients of exactly equal amplitudes.

What is claimed is:

1. In combination:

a pulse-amplitude-modulation (PAM) receiver for supplying digital samples of a baseband demodulation response to the pulse amplitude modulation of a selected radio-frequency carrier, which pulse amplitude modulation provides symbol coding of digital data;

a K-factor-improvement filter having a sparse kernel with two non-zero weighting coefficients of substantially equal amplitudes, the respective polarities of which said two non-zero weighting coefficients are adjustable and the differential delay between which said two non-zero weighting coefficients is adjustable, said K-factor-improvement filter connected for supplying its K-factor-improvement filter response to said digital samples of said baseband demodulation response supplied by said PAM receiver;

adaptive equalization filtering connected for supplying an equalized baseband response to said K-factor-improvement filter response, said equalized baseband response comprising baseband symbol coding of said digital data;

decoding apparatus connected for reproducing said digital data by decoding said baseband symbol coding in said equalized baseband response;

apparatus connected for measuring the channel impulse response (CIR) or cepstrum of the signal as received and supplying a measured CIR; and a filter coefficients computer connected for responding to said measured CIR, to adjust the respective polarities of said two non-zero weighting coefficients of said K-factor-improvement filter, and to adjust the differential delay between said two non-zero weighting coefficients of said K-factor-improvement filter.

2. The combination of claim 1, wherein said adaptive equalization filtering comprises at least one digital filter having a respective kernel comprising a plurality of weighting coefficients that are adjustable, and wherein said filter coefficients computer is further connected for responding to a measurement of said measured CIR to supply initial values of said weighting coefficients of each said digital filter comprised within said adaptive equalization filtering.

3. The combination of claim 2, wherein said filter coefficients computer is arranged for performing a subroutine to determine the respective polarities of said two non-zero weighting coefficients of said K-factor-improvement filter and further to determine the differential delay between said two non-zero weighting coefficients of said K-factor-improvement filter, said subroutine comprising steps of:

sorting the components of said measured CIR according to their respective energies;

determining the time range over which components of said measured CIR occur that have significantly large energy compared to the one of said components having the highest energy;

if said range of time is zero valued, using said measured CIR as an initialization CIR from which said filter coefficients computer computes values for the weighting coefficients of said adaptive equalization filtering;

if said range of time is zero valued, adjusting to zero said differential delay between said pair of non-zero weighting-coefficients of said K-factor-improvement filter;

if said time range is zero valued adjusting the respective polarities of said pair of non-zero weighting coefficients of said K-factor-improvement filter to be the same as the polarity of the one of said components of said measured CIR having the highest energy;

if said time range has a value, greater than zero, selecting the pair of echoes not previously considered that have the highest energies and adding the differential delay between them to said time range to generate an extended time range of echoes with significant energy;

if the extended time range of echoes with significant energy is within the de-echoing capability of adaptive equalization filtering, combining the measured CIR with the measured CIR as delayed by the differential delay between the pair of echoes currently being considered that have the highest energies so as to generate a modified CIR;

if one of the components of said modified CIR has significantly higher energy than the other components thereof, using said measured CIR as an initialization CIR from which said filter coefficients computer computes values for the weighting coefficients of said adaptive equalization filtering;

if one of the components of said modified CIR has significantly higher energy than the other components thereof, adjusting said differential delay between said pair of non-zero weighting coefficients of said K-factor-improvement filter to equal said differential delay between the pair of echoes currently being considered that have the highest energies;

if one of the components of said modified CIR has significantly higher energy than the other components thereof, adjusting the respective polarities of said pair of non-zero weighting coefficients of said K-factor-improvement filter to be the same as the respective polarities of said pair of echoes currently being considered that have the highest-energies;

if none of the components of said modified CIR has significantly higher energy than the other components thereof, looping back to selecting the pair of echoes not previously considered that have the highest energies and adding the differential delay between them to said time range to generate another extended time range of echoes with significant energy;

if the extended time range of echoes with significant energy is not within the de-echoing capability of adaptive equalization filtering, looping back to selecting the pair of echoes not previously considered that have the highest energies and adding the differential delay between them to said time range to generate another extended time range of echoes with significant energy;

if there is no remaining pair of echoes not previously considered, using said measured CIR as an initialization CIR from which said filter coefficients computer computes values for the weighting coefficients of said adaptive equalization filtering;

if there is no remaining pair of echoes not previously considered, adjusting to zero said differential delay between said pair of non-zero weighting coefficients of said K-factor-improvement filter; and if there is no remaining pair of echoes not previously considered, adjusting the respective polarities of said pair of non-zero weighting coefficients of said K-factor-improvement filter to be the same as the polarity of the one of said components of said measured CIR having the highest energy.

4. The combination of claim 3, wherein said filter coefficients computer is further connected for periodically responding to an updated measurement of said CIR or cepstrum of the signal as received to supply updated values of said weighting coefficients of each said digital filter comprised within said adaptive equalization filtering, and wherein said updated measurement of said CIR is generated by incrementally changing components of said measured CIR responsive to determinations of likely error in said equalized baseband response supplied by said adaptive equalization filtering.

5. The combination of claim 2, wherein said filter coefficients computer is further connected for periodically responding to an updated measurement of said CIR or cepstrum of the signal as received to supply updated values of said weighting coefficients of each said digital filter comprised within said adaptive equalization filtering, and wherein said updated measurement of said CIR is generated by incrementally changing components of said measured CIR responsive to determinations of likely error in said equalized baseband response supplied by said adaptive equalization filtering.

* * * * *